United States Patent
Chen

(10) Patent No.: US 12,271,021 B2
(45) Date of Patent: Apr. 8, 2025

(54) LUMINOUS KEYBOARD AND OPTICAL MODULE THEREOF

(71) Applicant: Darfon Electronics Corp., Taoyuan (TW)

(72) Inventor: Chao-Yu Chen, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 308 days.

(21) Appl. No.: 18/052,233

(22) Filed: Nov. 3, 2022

(65) Prior Publication Data

US 2023/0143245 A1    May 11, 2023

(30) Foreign Application Priority Data

Nov. 5, 2021   (TW) .................................. 110141391

(51) Int. Cl.
    *F21V 8/00*    (2006.01)
(52) U.S. Cl.
    CPC .................................. *G02B 6/006* (2013.01)
(58) Field of Classification Search
    CPC .... G02B 6/00; G02B 6/006; H01H 2215/006; H01H 2219/014; H01H 2219/036; H01H 2219/048; H01H 2219/054; H01H 2219/064; H01H 2221/00; H01H 2221/024; H01H 2221/03; H01H 2221/064; H01H 2221/08; H01H 2239/022; H01H 3/00; H01H 3/02; H01H 3/12; H01H 2003/12;
    (Continued)

(56) References Cited

U.S. PATENT DOCUMENTS

| 9,983,346 B2 | 5/2018 | Chen |
| 2010/0147661 A1* | 6/2010 | Takeda .................. H01H 13/83 200/314 |

(Continued)

FOREIGN PATENT DOCUMENTS

| CN | 108447724 B | 8/2019 |
| TW | 201248263 A1 | 12/2012 |

(Continued)

OTHER PUBLICATIONS

TW Office Action dated Dec. 4, 2023 in Taiwan application No. 111142061.

(Continued)

*Primary Examiner* — Anthony R Jimenez
(74) *Attorney, Agent, or Firm* — McClure, Qualey & Rodack, LLP

(57) ABSTRACT

An optical module for a luminous keyboard includes a mask film having a mask pattern, a patterned layer disposed on the mask film, and a light guide sheet disposed on one side of the mask film. The mask pattern defines a plurality of light-transparent regions respectively corresponding to a plurality of keyswitches of the luminous keyboard. The patterned layer has a light transmittance larger than that of the mask pattern. The light guide sheet has a light-exit edge, and a vertical projection of the light-exit edge of the light guide sheet on the mask film at least partially falls within an outer light-transparent region of the plurality of light-transparent regions. The patterned layer is at least partially located in the outer light-transparent region and adjacent to a region boundary of the outer light-transparent region.

17 Claims, 13 Drawing Sheets

(58) Field of Classification Search
CPC ........... H01H 2003/32; H01H 2009/02; H01H 2013/00; H01H 2013/02; H01H 2013/50; H01H 2013/52; H01H 2013/525; H01H 2013/56; H01H 2203/05; F21V 8/00
USPC .................................................. 200/310, 345
See application file for complete search history.

(56) References Cited

U.S. PATENT DOCUMENTS

| | | |
|---|---|---|
| 2018/0166233 A1 | 6/2018 | Hsu |
| 2018/0323021 A1 | 11/2018 | Lai |
| 2020/0042101 A1 | 2/2020 | Cheng |

FOREIGN PATENT DOCUMENTS

| | | |
|---|---|---|
| TW | I607471 B | 12/2017 |
| TW | 202203278 A | 1/2022 |
| TW | M626407 U | 5/2022 |
| TW | 202238648 A | 10/2022 |

OTHER PUBLICATIONS

TW Office Action dated Dec. 22, 2023 in Taiwan application No. 112116626.

\* cited by examiner

LUMINOUS KEYBOARD AND OPTICAL MODULE THEREOF

BACKGROUND OF THE INVENTION

1. Field of the Invention

The invention generally relates to a luminous keyboard. Particularly, the invention relates to an optical module of a luminous keyboard.

2. Description of the Prior Art

With the rapid development of today's electronic technology and information industry, all kinds of electronic devices are developing towards the trend of light, thin, short, small, and diversified functions. For example, desktop and laptop computers have become indispensable electronic devices for modern people in daily life or work, and most of the peripheral products used are keyboards, which are the most common and very important input devices. As the electronic products become miniature and light-weighted, the slim border design is one of the important research and development approaches of keyboards today. However, for luminous keyboards, the integration of the keyswitch module and the backlight module must be considered, especially the adhesion between the multiple optical films of the backlight module and the avoidance of lateral light leakage, so that the lighting uniformity between the outer keyswitch and the inner keyswitch is not easy to control. In particular, in the slim border design, as the margin of the border is reduced, the luminous keyboard generally encounters the problem of too bright or too dark at the outer keyswitches.

Moreover, for the purpose of heat dissipation or positioning, the backlight module generally has a plurality of holes or openings to allow air or positioning means (e.g. bolts or screws) to pass therethrough, so that the keyswitches around the holes will become darker or brighter than other keyswitches. In addition, the keyswitches neighboring the light source of the backlight module will also become too bright or too dark in comparison with other keyswitches.

SUMMARY OF THE INVENTION

It is an object of the invention to provide a luminous keyboard and an optical module thereof, which compensate for the brightness of the keyswitches by edge-lighting of the light guide sheet.

It is another object of the invention to provide a luminous keyboard and an optical module thereof, which incorporate the edge of the light guide sheet with the mask pattern design of the mask film and the patterned layer to enhance the lighting effect of keyswitches.

In an embodiment, the invention provides an optical module for a luminous keyboard including a plurality of keyswitches. The optical module includes a mask film having a mask pattern, a patterned layer disposed on the mask film, and a light guide sheet on one side of the mask film. The mask pattern defines a plurality of light-transparent regions respectively corresponding to the plurality of keyswitches, and an outer light-transparent region of the plurality of light-transparent regions has a region boundary. The patterned layer has a light transmittance larger than a light transmittance of the mask pattern. The light guide sheet has a light-exit edge, wherein a vertical projection of the light-exit edge of the light guide sheet on the mask film at least partially falls within the outer light-transparent region, and the patterned layer is at least partially located in the outer light-transparent region adjacent to the region boundary.

In an embodiment, the patterned layer extends from the region boundary into the outer light-transparent region to define a layer boundary, and the vertical projection of the light-exit edge of the light guide sheet on the mask film is located between the region boundary and the layer boundary.

In an embodiment, the patterned layer extends from the region boundary into the outer light-transparent region to define a layer boundary, and the vertical projection of the light-exit edge of the light guide sheet on the mask film is farther away from the region boundary than the layer boundary is.

In an embodiment, the light guide sheet has a hole, and a vertical projection of the hole on the mask film falls in the outer light-transparent region.

In an embodiment, the mask film further has an auxiliary mask pattern in the outer light-transparent region. The vertical projection of the hole at least partially overlaps the auxiliary mask pattern. The auxiliary mask pattern has a light transmittance larger than or equal to the light transmittance of the mask pattern.

In another embodiment, the invention provides an optical module for a luminous keyboard including a plurality of keyswitches. The optical module includes a mask film having a mask pattern, a patterned layer disposed on the mask film, and a light guide sheet on one side of the mask film. The mask pattern defines a plurality of light-transparent regions respectively corresponding to the plurality of keyswitches. The plurality of light-transparent regions includes an outer light-transparent region. The patterned layer has a light transmittance larger than a light transmittance of the mask pattern, wherein at least a portion of the patterned layer does not overlap the mask pattern and is adjacent to the outer light-transparent region, so as to define a region boundary of the outer light-transparent region together with the mask pattern.

In an embodiment, the light guide sheet has a light-exit edge, and a vertical projection of the light-exit edge on the mask film is located outside the outer light-transparent region and overlaps the at least a portion of the patterned layer.

In an embodiment, the optical module further includes a reflective film on one side of the light guide sheet opposite to the mask film, wherein a mask portion is disposed between the reflective film and the light guide sheet and adjacent to the light-exit edge, and a vertical projection of the mask portion on the mask film at least partially overlaps the at least a portion of the patterned layer.

In a further embodiment, the invention provides a luminous keyboard including a keyswitch module and the optical module described above. The keyswitch module includes a baseplate and a plurality of keyswitches disposed on the baseplate. The plurality of keyswitches includes at least one outer keyswitch and at least one inner keyswitch. The outer keyswitch includes a keycap, and an outer edge of the keycap is substantially aligned with an edge of the baseplate. The inner keyswitch is disposed at one side of the outer keyswitch away from the edge of the baseplate. The optical module is disposed under the baseplate, so that the mask film is closer to the baseplate than the light guide sheet is. The edge of the mask film adjacent to the region boundary is substantially aligned with the edge of the baseplate.

In an embodiment, a vertical projection of the keycap of the outer keyswitch on the mask film exceeds outside the region boundary of the outer light-transparent region.

In yet another embodiment, the invention provides an optical module for a luminous keyboard. The optical module includes a mask film having a mask pattern and a patterned layer disposed on the mask film. The mask pattern defines a light-transparent region, a light-shielding region, and a light modulation region. The light modulation region extends from the light-shielding region to the light-transparent region. The patterned layer has a light transmittance larger than a light transmittance of the mask pattern, wherein the patterned layer is located in the light modulation region, so the light modulation region has a light transmittance larger than a light transmittance of the light-shielding region and smaller than a light transmittance of the light-transparent region.

In an embodiment, the light modulation region includes a plurality of light-transparent sub-regions and a plurality of light-shielding sub-regions alternatingly disposed. At least a portion of the patterned layer is located in the light-transparent sub-regions.

In an embodiment, each of the plurality of light-shielding sub-regions has a gradually reduced width, so a width of each of the plurality of light-transparent sub-regions and a width of the portion of the patterned layer in each of the light-transparent sub-regions are gradually increased from the light-shielding region toward the light-transparent region.

In an embodiment, each of the plurality of light-shielding sub-regions has a substantially constant width, so a width of each of the plurality of light-transparent sub-regions and a width of the portion of the patterned layer in each of the light-transparent sub-regions are substantially constant from the light-shielding region to the light-transparent region.

In an embodiment, the optical module further includes a light source having a light-emitting surface, wherein a vertical projection of the light source on the mask film falls within the light-shielding region. The plurality of light-shielding sub-regions extends from the light-shielding region and is located between the light-transparent region and the light-emitting surface.

In an embodiment, the optical module further includes a light guide sheet having an edge. When the mask film is stacked on the light guide sheet, a vertical projection of the edge of the light guide sheet on the mask film at least partially falls in the light modulation region or in the light-shielding region adjacent to the light modulation region.

In an embodiment, the optical module further includes a light guide sheet having a hole. When the mask film is stacked on the light guide sheet, a vertical projection of an edge of the hole of the light guide sheet on the mask film at least partially falls within the light modulation region.

In an embodiment, the light modulation region includes a plurality of light-transparent sub-regions and a plurality of light-shielding sub-regions alternatingly disposed along the edge of the hole of the light guide sheet. At least a portion of the patterned layer is located in the light-transparent sub-regions, wherein each of the plurality of light-shielding sub-regions has a gradually reduced width, so a width of each of the plurality of light-transparent sub-regions and a width of the portion of the patterned layer in each of the light-transparent sub-regions are gradually increased from the light-shielding region toward the light-transparent region.

In an embodiment, the light modulation region includes a plurality of light-transparent sub-regions and a plurality of light-shielding sub-regions alternatingly disposed along the edge of the hole of the light guide sheet. At least a portion of the patterned layer is located in the light-transparent sub-regions, wherein each of the plurality of light-shielding sub-regions has a gradually increased width, so a width of each of the plurality of light-transparent sub-regions and a width of the portion of the patterned layer in each of the light-transparent sub-regions are gradually increased from the light-shielding region toward the light-transparent region.

In an embodiment, the light-shielding region partially surrounds the light-transparent region to form a boundary line, and two ends of the boundary line are substantially connected to middle sections of two opposite sides of the light modulation region.

In another embodiment, the invention provides a luminous keyboard including the optical module described above and at least one keyswitch. The keyswitch is disposed above the optical module and includes a keycap. The vertical projection of the keycap on the mask film at least partially covers the light-transparent region.

In an embodiment, the keycap has a light-transparent portion. The plurality of light-shielding sub-regions and the plurality of light-transparent sub-regions are alternatingly arranged along an extending direction of the light-transparent portion.

Compared with the prior art, the luminous keyboard and the optical module of the invention not only enhance the brightness of the keyswitches by the edge-lighting characteristics of the light guide sheet, but also incorporate the mask pattern design of the mask film with the patterned layer, so that the luminous keyboard is improved with the lighting uniformity and suitable for the slim border design.

DETAILED DESCRIPTION OF THE PREFERRED EMBODIMENT

The invention provides a luminous keyboard and an optical module thereof, which promotes the brightness of keyswitches, especially the outer keyswitches, so that the keyswitches can have a stable lighting effect. The luminous keyboard of the invention can be an independent keyboard or integrated into electronic devices (e.g. mobile devices, laptop computers). Specifically, the luminous keyboard can adopt the slim border design, but not limited thereto. Hereinafter, an independent computer keyboard (shown in FIG. 1) is illustrated as an example.

Figure 1:
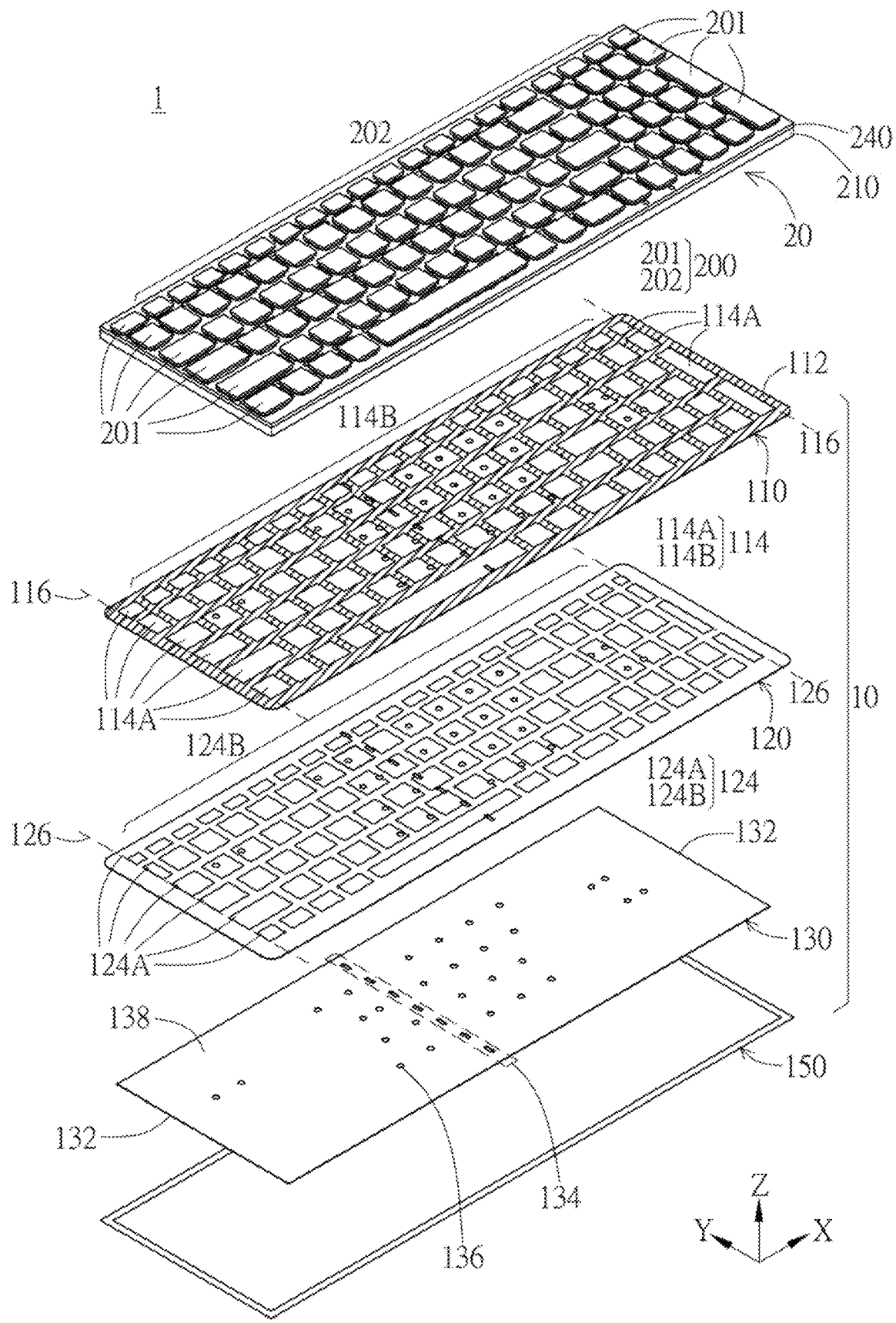
FIG. 1 is a schematic exploded view of the luminous keyboard in an embodiment of the invention.

As shown in FIG. 1, in an embodiment, the luminous keyboard 1 includes an optical module 10 and a keyswitch module 20. The optical module 10 is disposed under the keyswitch module 20. The keyswitch module 20 includes a plurality of keyswitches 200, and the plurality of keyswitches 200 includes at least one outer keyswitch 201 and at least one inner keyswitch 202. In one aspect, the plurality of keyswitches 200 are arranged in multiple rows along the Y-axis direction. The outmost keyswitches in each row, such as two keyswitches respectively at two ends in the X-axis direction, can be the outer keyswitches 201, and the keyswitches between the outer keyswitches 201 at the two ends can be the inner keyswitches 202. In another aspect, among the multiple rows of keyswitches arranged along the Y-axis direction, the keyswitches in the outmost rows (e.g. the topmost and bottommost rows in the Y-axis direction) can be the outer keyswitches 201, and the keyswitches between the outer keyswitches 201 in the outmost rows can be the inner keyswitches 202. In other words, the outer keyswitches 201 are not adjacent to other keyswitches by at least one side, such as the keyswitches disposed around the outer perimeter, and the inner keyswitches 202 are surrounded by other keyswitches at all sides. In this embodiment, the left edges of the outer keyswitches 201 at the left side (e.g. the left edges of the keycaps) are aligned along the Y-axis direction, and the right edges of the outer keyswitches 201 at the right side (e.g. the right edges of the keycaps) are aligned along the Y-axis direction, but not limited thereto. Moreover, the upper edges of the outer keyswitches 201 at the topmost row (e.g. the upper edges of the keycaps) are aligned along the X-axis direction, and the lower edges of the outer keyswitches 201 at the bottommost row (e.g. the lower edges of the keycaps) are aligned along the X-axis direction, but not limited thereto.

Figure 2A:
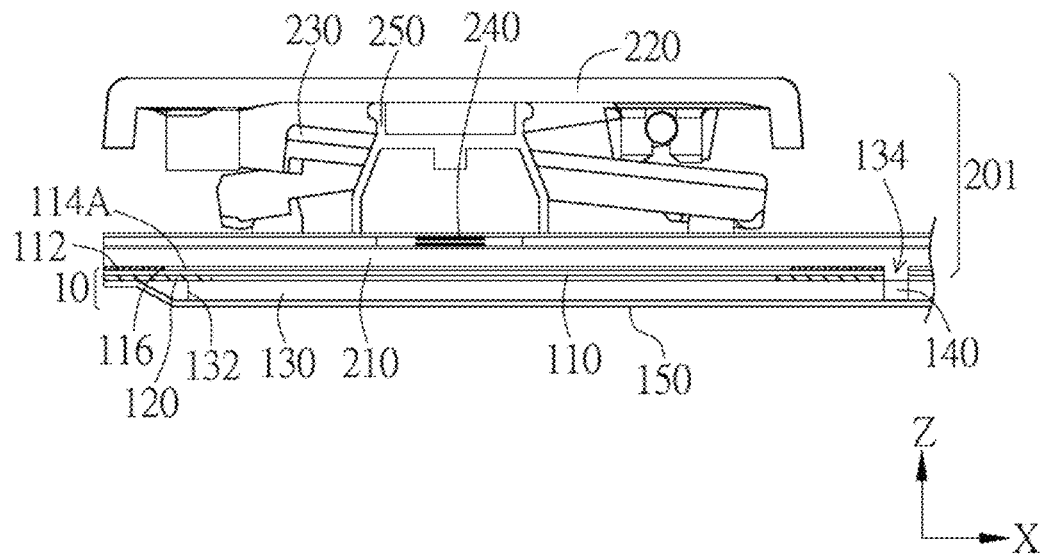
FIG. 2A is a schematic cross-sectional view of the keyswitch of the luminous keyboard in a first embodiment of the invention.

Specifically, the keyswitch 200 can be any suitable key unit with light-transparent keycap. The light-transparent keycap can be a keycap with one or more light-transparent portions or an entire keycap of light-transparent. FIG. 2A is a schematic cross-sectional view of the keyswitch of the luminous keyboard of a first embodiment of the invention. As shown in FIG. 2A, in an embodiment, the keyswitch (e.g. the outer keyswitch 201 at the left side) includes the scissors-like support mechanism 230 movably coupled with the keycap 220 and the baseplate 210 to support the keycap 220 to move relative to the baseplate 210 and compress the rubber dome 250 to trigger the switch layer 240 (e.g. membrane switch), and the rubber dome 250 provides the restoring force to enable the keycap 220 to return to its original position, but not limited thereto. In other embodiments, the scissors-like support mechanism 230 can be replaced with other up-down support mechanisms, such as butterfly-type support mechanism, sliding block support mechanism, cantilever support mechanism. The rubber dome 250 can be replaced with other restoring units, such as magnets, spring. Moreover, the switch layer 240 can be replaced with other switch units, such as mechanical switch, optical switch, magnetic switch. That is, the keyswitches 200 of the keyswitch module 20 can have any suitable configuration, which can generate the triggering signal after being pressed.

Referring to FIG. 1 again, the optical module 10 includes a mask film 110, a patterned layer 120, and a light guide sheet 130. The mask film 110 has a mask pattern 112. The mask pattern 112 defines a plurality of light-transparent regions 114, and the plurality of light-transparent regions 114 correspond to the plurality of keyswitches 200, respectively. For example, the plurality of light-transparent regions 114 includes outer light-transparent regions 114A and inner light-transparent regions 114B. The outer light-transparent regions 114A correspond to the outer keyswitches 201. For example, the outer light-transparent regions 114A correspond to the outer keyswitches 201 at the left side along the Z-axis direction. The inner light-transparent regions 1146 correspond to the inner keyswitches 202. For example, the inner light-transparent regions 1146 correspond to the inner keyswitches 202 along the Z-axis direction. The outer light-transparent region 114A has a region boundary 116. For example, the region boundary 116 of the outer light-transparent region 114A at the left side is the left boundary extending along the Y-axis direction, and the region boundary 116 of the outer light-transparent region 114A at the right side is the right boundary extending along the Y-axis direction. Specifically, the mask film 110 is disposed on one side of the light guide sheet 130 and has the mask pattern 112 to selectively allow light to pass therethrough and block light. For example, the mask film 110 can be a light-transparent optical film (e.g. polyethylene terephthalate (PET) film) with light-blocking material (e.g. ink) disposed thereon to form the mask pattern 112, so as to allow light to pass through the light-transparent regions 114 and block light at locations where the keyswitch module 20 does not require light, such as the gap between the keyswitches 200. In an embodiment, the shape and size of the mask film 110 preferably correspond to those of the baseplate 210 of the keyswitch module 20, but not limited thereto.

The patterned layer 120 is disposed on the mask film 110. The patterned layer 120 has a light transmittance larger than a light transmittance of the mask pattern 112 and smaller than a light transmittance of each of the plurality of light-transparent regions 114. The patterned layer 120 is preferably formed by printing a light blocking material in a predetermined pattern. The patterned layer 120 can be printed on a separate light-transparent film or printed on the mask film 110. For example, the patterned layer 120 is preferably printed on a surface of the mask film 110 that faces the light guide sheet 110, but not limited thereto. According to practical applications, the patterned layer 120 and the mask pattern 112 can be printed on the same surface or different surfaces of the mask film 110. In an embodiment, the patterned layer 120 can define a plurality of light-permeable regions 124, and the plurality of light-permeable regions 124 are disposed corresponding to the plurality of light-transparent regions 114 (and the keyswitches 200). For example, the plurality of light-permeable regions 124 includes outer light-permeable regions 124A and inner light-permeable regions 124B. The outer light-permeable regions 124A correspond to the outer light-transparent regions 114A and the outer keyswitches 201 along the Z-axis direction. The inner light-permeable regions 124B correspond to the inner light-transparent regions 114B and the inner keyswitches 202 along the Z-axis direction. The outer light-permeable region 124A has a layer boundary 126. For example, the layer boundary 126 of the outer light-permeable region 124A at the left side is the left boundary extending along the Y-axis direction, and the layer boundary 126 of the outer light-permeable region 124A at the right side is the right boundary extending along the Y-axis direction. Specifically, the patterned layer 120 is disposed on one side of the light guide sheet 130, such as at the same side as the mask film 110, and the patterned layer 120 can selectively partially block light or allow light to pass therethrough. The patterned layer 120 has a light transmittance larger than the light transmittance of the mask pattern 112. For example, the patterned layer 120 can be a light-transparent optical film (e.g. PET film) with light-blocking material disposed thereon to form the patterned layer 120. Alternatively, the patterned layer 120 can be formed by printing the light blocking material on the mask film 110 to omit the additional light-transparent optical film. In other words, the patterned layer 120 and the mask pattern 112 can be formed on the same light-transparent optical film, so that the mask film 110 has not only the mask pattern 112, but also the patterned layer 120 thereon. The light blocking material adapted to form the patterned layer 120 has the light transmittance larger than that of the light blocking material adapted to form the mask pattern 112 and smaller than that of the light-transparent optical film of the mask film 110. For example, the light blocking material adapted to form the mask pattern 112 can be the black ink, and the light blocking material adapted to form the patterned layer 120 can be ink of any suitable color other than black, such as white ink. As such, when light illuminates on the mask pattern 112, the patterned layer 120, and the light-transparent region 114 (or the light-permeable region 124), the mask pattern 112 substantially completely blocks the light (i.e., no light passing therethrough), the patterned layer 120 blocks a portion of the light (i.e., part of the light passing therethrough and part of the light being blocked), and the light-transparent region 114 (or the light-permeable region 124) substantially allows all of the light to pass therethrough. It is noted that according to practical applications, the patterned layer 120 can be locally disposed on the mask film 110 without forming the light-permeable regions 124, which correspond to the light-transparent region 114. In other words, the patterned layer 120 can be formed at any suitable location of the mask film 110 in any suitable pattern to adjust the local light transmittance or brightness.

The light guide sheet 130 is disposed on one side of the mask film 110, such as the lower side. The light guide sheet 130 has a light-exit edge 132, such as the edge of the light-exit surface. The light-exit edge 132 corresponds to the region boundary 116, so that the vertical projection of the light-exit edge 132 of the light guide sheet 130 on the mask film 110 at least partially falls within the outer light-transparent region 114A. Specifically, the light guide sheet 130 can be a film-like or sheet-like plate, which can be made of any suitable optical materials, such as optical polymers. The size of the light guide sheet 130 is slightly smaller than that of the mask film 110, and the light guide sheet 110 has a light-output surface 138 corresponding to the plurality of light-transparent regions 114 (and light-permeable regions 124). For example, the size of the light guide sheet 130 in the X-axis direction is preferably smaller than that of the mask film 110, so that the edge of the mask film 110 extends beyond the light-exit edge 132 of the light guide sheet 130, facilitating the adhesion with other components, such as the reflective film 150, the baseplate 210. In an embodiment, the light-exit edge 132 of the light guide sheet 130 defines the boundary of the light-output surface 138 in the X-axis direction. In this embodiment, the light guide sheet 130 has a plurality of light source holes 134, and the lateral surface inside the light source hole 134 can be the light-input surface of the light guide sheet 130. The top surface of the light guide sheet 130 (i.e., the upper surface that extends along the X-Y plane) can be the light-output surface 138 of the light guide sheet 130. Light enters the light guide sheet 130 from the light-input surface, travels along the extension direction of the light guide sheet (e.g. along the X-axis and Y-axis directions) through the total reflection, and then emits out from the plurality of light-transparent regions 114 (and the light-permeable regions 124) of the mask film 110.

As shown in FIG. 2A, in an embodiment, the optical module 10 includes one or more light sources 140, which provides light into the light guide sheet 130. As such, the optical module 10 can be a backlight module of the luminous keyboard 1. Specifically, the light source 140 is preferably a light-emitting diode (LED), such as a side-lighting LED, but not limited thereto. The light source 140 is disposed in the light source hole 134, so that the light-emitting surface preferably faces the light-input surface of the light guide sheet 130, and the light enters the light guide sheet 130 from the light-input surface. In an embodiment, a plurality of light sources 140 is preferably integrated on a circuit board to form an integrated light source unit, so as to enhance the assembly efficiency.

Moreover, as shown in FIG. 1, the optical module 10 can optionally include a reflective film 150. The reflective film 150 is disposed on one side of the light guide sheet 130 opposite to the mask film 110, such as the lower side of the light guide sheet 130. The reflective film 150 is configured to reflect the light emitting from the lower surface of the light guide sheet 130 back to the light guide sheet 130. Specifically, the reflective film 150 can be a reflective film made of reflective materials (e.g. metal foil), a layer of reflective material coated on a non-reflective film, or a plastic film doped with reflective particles (e.g. PET film doped with reflective particles). The shape and size of the reflective film 150 preferably correspond to those of the mask film 110, and the malleability/deformability of the reflective film 150 is preferably larger than that of the mask film 110. In other words, the reflective film 150 is much more deformable than the mask film 110 is, so that the reflective film 150 is readily to be adhered.

Figure 2B:
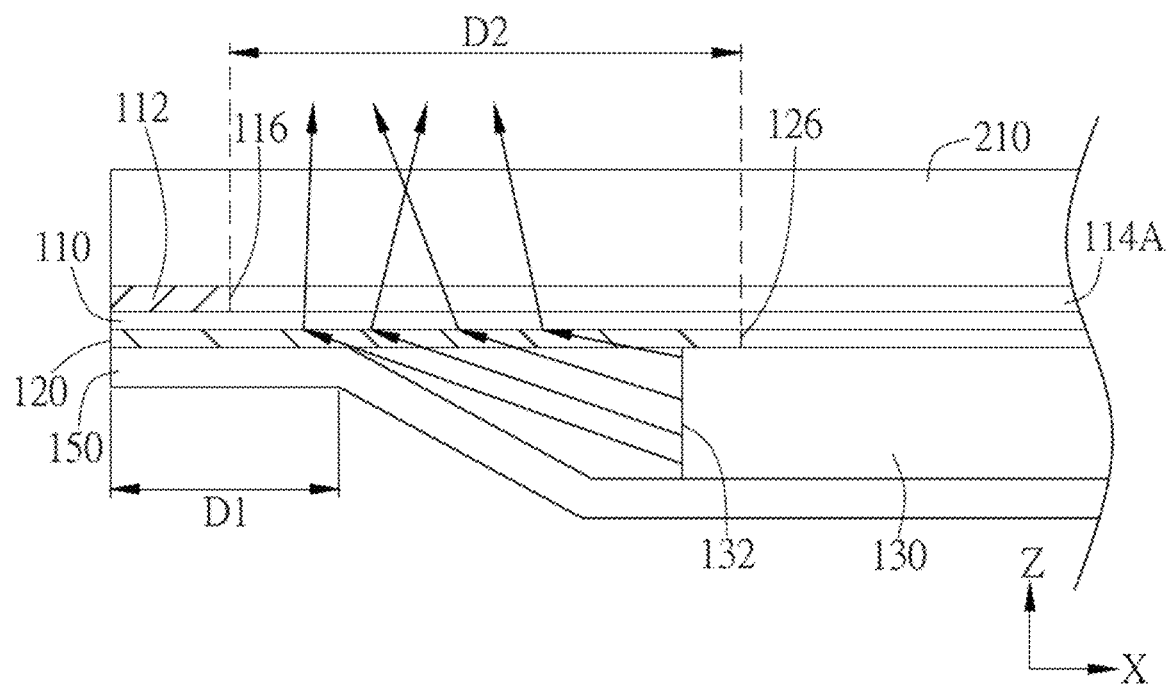
FIG. 2B is a partially enlarged view of FIG. 2A.

As shown in FIGS. 2A and 2B, FIG. 2B is a partially enlarged view of FIG. 2A, and FIG. 2B just shows the optical module 10 and the baseplate 210 of the keyswitch module 20 and omits the components (e.g. switch layer 240, rubber dome 250, scissors-like support mechanism 230, and the keycap 220) on the baseplate 210. The upper surface of the end portion of the mask film 110 is adhered to the lower surface of the baseplate 210, and the lower surface of the end portion of the mask film 110 is adhered to the upper surface of the reflective film 150, so that the light guide sheet 130 is enclosed between the mask film 110 and the reflective film 150 to prevent lateral light leakage. Specifically, as shown in FIG. 2B, the mask pattern 112 on the upper surface of the end portion of the mask film 110 is adhered to the lower surface of the baseplate 210, and the patterned layer 120 on the lower surface of the end portion of the mask film 110 is adhered to the reflective film 150, so that the light guide sheet 130 is enclosed between the mask film 110 and the reflective film 150, but not limited thereto. In this embodiment, the keycap 220 of the outer keyswitch 201 and the baseplate 210 can be flushed with the edge of the optical module 10. For example, the left edges of the keycap 220, the baseplate 210, the mask film 110, and the reflective film 150 are preferably aligned with each other along the stacking direction (e.g. the Z-axis direction) to facilitate the slim border design of the luminous keyboard 1. Specifically, in the slim border design, the size and shape of the inner light-transparent region 114B is preferably consistent with those of its corresponding keycap 220, i.e., the vertical projections of the inner light-transparent region 114B and the keycap 220 on the baseplate 210 substantially completely overlap with each other. The size and shape of the outer light-transparent region 114A (and the light-permeable region 124A) are limited by the considerations of adhesion requirements and lateral light leakage, so the size of the outer light-transparent region 114A (and the light-permeable region 124A) is smaller than its corresponding keycap 220. For example, the outer light-transparent region 114A (and the light-permeable region 124A) is retreated from the edge of the mask film 110 by a predetermined width in the X-axis direction. In an embodiment, the adhesion width D1 of the reflective film 150 and the mask film 110, such as the adhesion distance along the X-axis direction from the edge, is preferably equal to or larger than 1.5 mm, to reduce the possibility of light leakage due to the detachment of the reflective film 150 and the mask film 110 of the optical module 10 as the luminous keyboard 1 adopts the slim border design. In other words, for a single side, the size of the outer light-transparent region 114A in the X-axis is shorter than that of its corresponding keycap 220 by at least 1.5 mm. For the outer light-transparent regions 114A at both sides, the size of the light guide sheet 130 in the X-axis direction is shorter than that of the mask film 110 by at least 3.0 mm (=2×1.5 mm), but not limited thereto.

Specifically, in the slim-border design, the inner light-transparent region 1146 and the inner light-permeable region 124B preferably correspond to each other in size and shape. In other words, the vertical projections of the inner light-transparent region 1146 and corresponding inner light-permeable region 124B on the baseplate 210 preferably substantially completely overlap with each other, but not limited thereto. In another embodiment, the inner light-transparent region 114B can be slightly larger than the inner light-permeable region 124B according to practical applications. The size and shape of the outer light-transparent region 114A and the outer light-permeable region 124A are limited by the considerations of adhesion requirements and lateral light leakage, so the size of the outer light-permeable region 124A is smaller than its corresponding outer light-transparent region 114A. For example, the outer light-permeable region 124A extends beyond the region boundary 116 by a predetermined width in the X-axis direction. In an embodiment, a distance between one side of the outer light-permeable region 124A and one side of the outer light-transparent region 114A is defined as D2 (e.g. a distance from the region boundary 116 to the layer boundary 126 in the X-axis direction), and the distance D2 is preferably 1 mm to 3 mm, to reduce the possibility of light leakage due to the detachment of the reflective film 150 and the mask film 110 of the optical module 10 as the luminous keyboard 1 adopts the slim border design. In other words, for a single side, the size of the outer light-transparent region 114A is retreated from its corresponding outer light-permeable region 124A toward the edge by 1 mm to 3 mm in the X-axis direction, but not limited thereto.

Figure 2C:
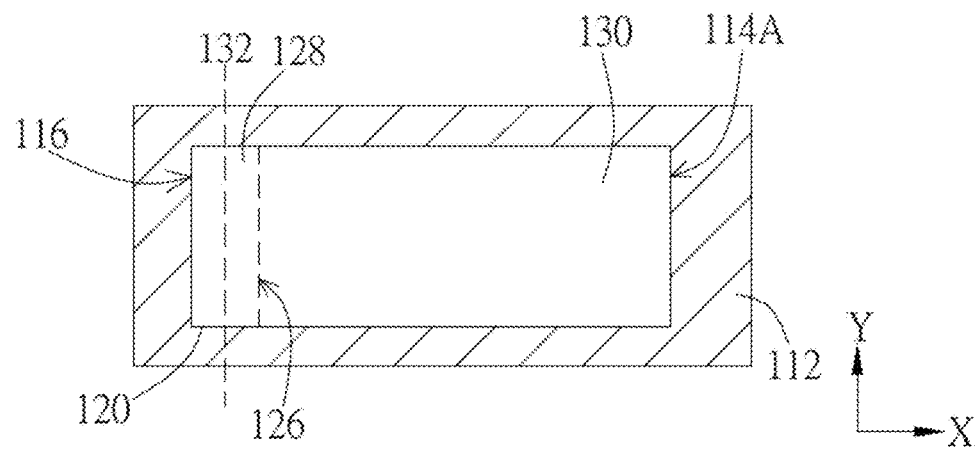
FIG. 2C is a top view of FIG. 2A, showing the relative position of the outer light-transparent region of the mask film, the patterned layer, and the light-exit edge of the light guide sheet.
Figure 2D:
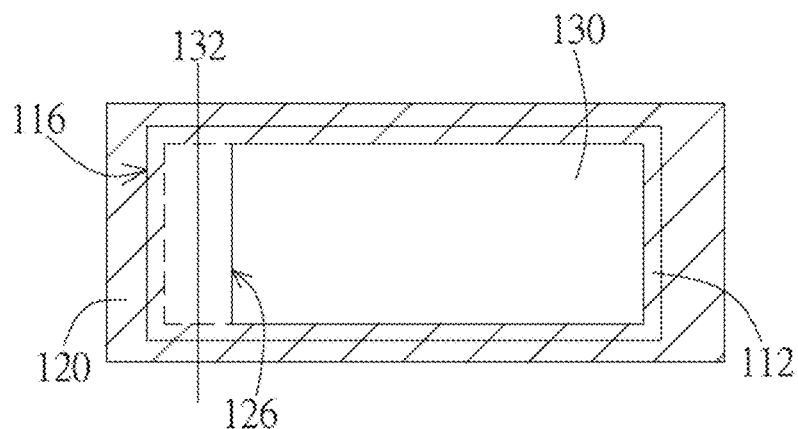
FIG. 2D is a bottom view of FIG. 2A corresponding to FIG. 2C.

Referring to FIGS. 2C and 2D, FIG. 2C is a top view of FIG. 2A and shows the relative position of the outer light-transparent region 114A of the mask film 110, the patterned layer 120, and the light-exit edge 132 of the light guide sheet 130. FIG. 2D is a bottom view of FIG. 2A corresponding to FIG. 2C and shows the relative position of the patterned layer 120 and the light-exit edge 132 of the light guide sheet 130. In this embodiment, the patterned layer 120 is at least partially located in the outer light-transparent region 114A adjacent to the region boundary 116. The patterned layer 120 (or the vertical projection thereof on the mask film 110) extends from the region boundary 116 into the outer light-transparent region 114A to define the layer boundary 126, and the vertical projection of the light-exit edge 132 of the light guide sheet 130 on the mask film 110 is located between the region boundary 116 and the layer boundary 126. In other words, the patterned layer 120 at least partially extends beyond the region boundary 116 into the light-transparent region 114A, and the portion of the patterned layer 120 extending into the light-transparent region 114A forms a strip region 128. The strip region 128 extends along the region boundary 116, and the vertical projection of the light-exit edge 132 of the light guide sheet 130 on the mask film 110 (or the patterned layer 120) at least partially falls within the strip region 128. The layer boundary 126 and the region boundary 116 are located at opposite sides with respect to the light-exit edge 132 in the X-axis direction. The vertical projection of the light-exit edge 132 on the mask film 110 at least partially falls within the outer light-transparent region 114A and overlaps with the portion of the patterned layer 120 extending into the outer light-transparent region 114A (e.g. the strip region 128), so that the lateral surface (or end surface) of the light guide sheet 130 adjacent to the light-exit edge 132 can serve as a light-output surface to enhance the brightness of the outer keyswitch 201. The light-exit edge 132 can extend substantially parallel to the region boundary 116, but is not limited thereto. As shown in FIG. 2D, the patterned layer 120 partially overlaps the mask pattern 112 and extends from the region boundary 116 into the outer light-transparent region 114A, so the portion of the patterned layer 112 located in the outer light-transparent region 114A does not overlap the mask pattern 112, but not limited thereto. In another embodiment, the patterned layer 120 can be located only in the outer light-transparent region 114A without overlapping the mask pattern 112. As such, when a portion of the outer light-transparent region 114A becomes locally brighter due to the light emitting from the light-exit edge 132 of the light guide sheet 130, the portion of the patterned layer 120 in the outer light-transparent region 114A can correspondingly adjust the brightness of the outer light-transparent region 114A.

Figure 2E:
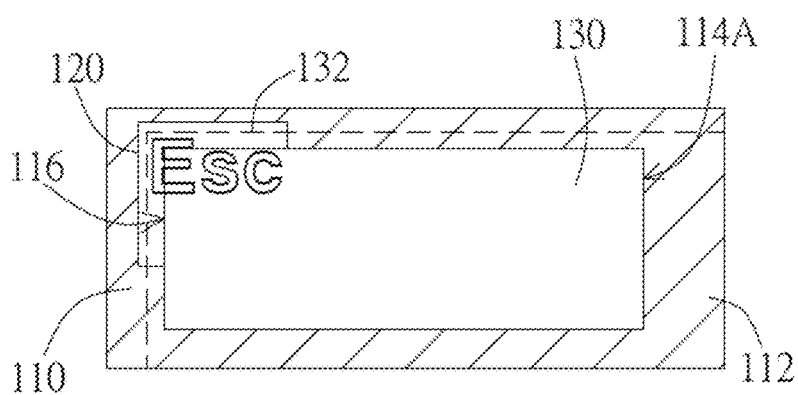
FIG. 2E is a top view of the keyswitch of the luminous keyboard in a second embodiment of the invention, showing the relative position of the outer light-transparent region of the mask film, the patterned layer, and the light-exit edge of the light guide sheet.

FIG. 2E is a top view of the keyswitch of the luminous keyboard in a second embodiment of the invention, showing the relative position of the mask film 110, the patterned layer 120, and the light guide sheet 130. For example, the vertical projection of the light-exit edge 132 on the mask film 110 is located outside the outer light-transparent region 114A and overlaps the at least a portion of the patterned layer 120. FIG. 2E is a variant embodiment of FIG. 2C. In this embodiment, at least a portion of the patterned layer 120 does not overlap the mask pattern 112 and is adjacent to the outer light-transparent region 114A, so as to define the region boundary 116 of the outer light-transparent region 114A together with the mask pattern 112. Specifically, in an embodiment, the patterned layer 120 is disposed on the mask film 110 around the corner of the outer light-transparent region 114A, such as around the upper left corner of the outer light-transparent region 114A, and the vertical projection of the light-exit edge 132 partially falls on the portion of the patterned layer 120 which does not overlap the mask pattern 112. As such, with the arrangement of the patterned layer 120, the brightness at the corner of the outer light-transparent region 114A can be enhanced, and the uniformity of light distribution in the outer keyswitch 201 can be improved. In other words, the patterned layer 120 can be disposed at any place around or in the outer light-transparent region 114A where the brightness is required to be modulated. For example, to increase the brightness, the patterned layer 120 can be disposed to replace a portion of the mask pattern 112, so as to increase the light transmittance around the corresponding portion. To decrease the brightness, the patterned layer 120 can be disposed in the light-transparent region 114 (e.g. the outer light-transparent region 114A), so as to block a portion of light at the corresponding portion. Moreover, the patterned layer 120 can be disposed to replace a portion of the mask pattern 112 and also disposed in the light-transparent region 114 to improve the uniformity of brightness of the light-transparent region 114. For example, in this embodiment, the patterned layer 120 is illustrated to replace a portion of the mask pattern 112 at the left corner around the outer light-transparent region 114A and define the region boundary 116 with the mask pattern 112, but not limited thereto. According to practical applications, the patterned layer can further extend into the outer light-transparent region 114A, so the patterned layer 120 not only replaces a portion of the mask pattern 112 around the outer light-transparent region 114A, but also extends into the outer light-transparent region 114A.

Figure 3A:
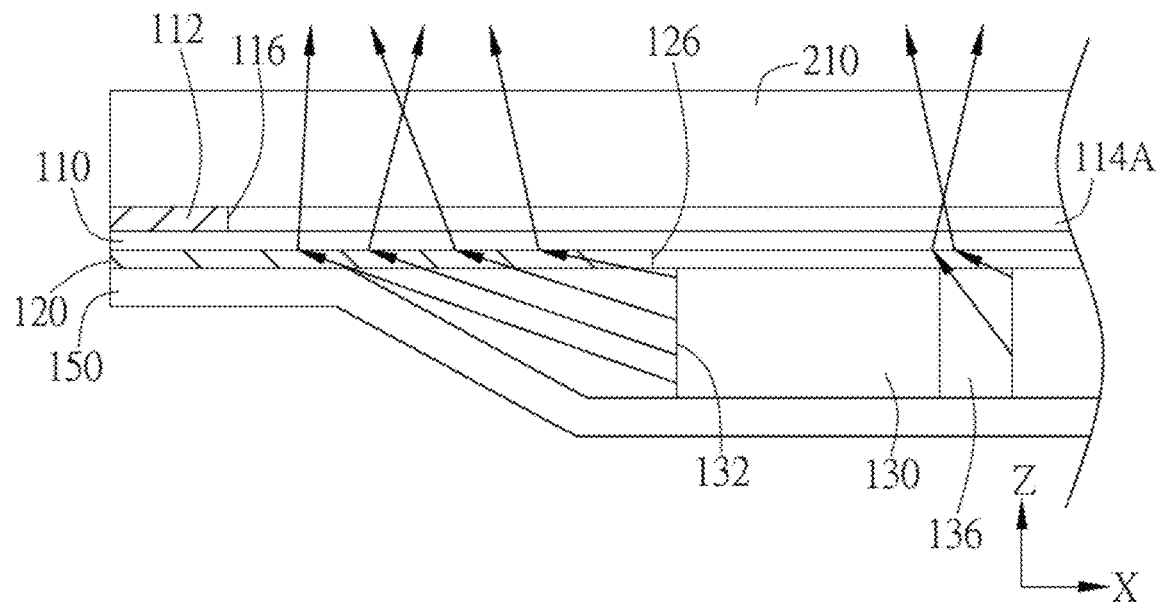
FIG. 3A and FIG. 3B are a schematic partially enlarged cross-sectional view and a schematic top view of the keyswitch of the luminous keyboard in a third embodiment of the invention, showing the relative position of the outer light-transparent region of the mask film, the patterned layer, and the light-exit edge and the hole of the light guide sheet.
Figure 3B:
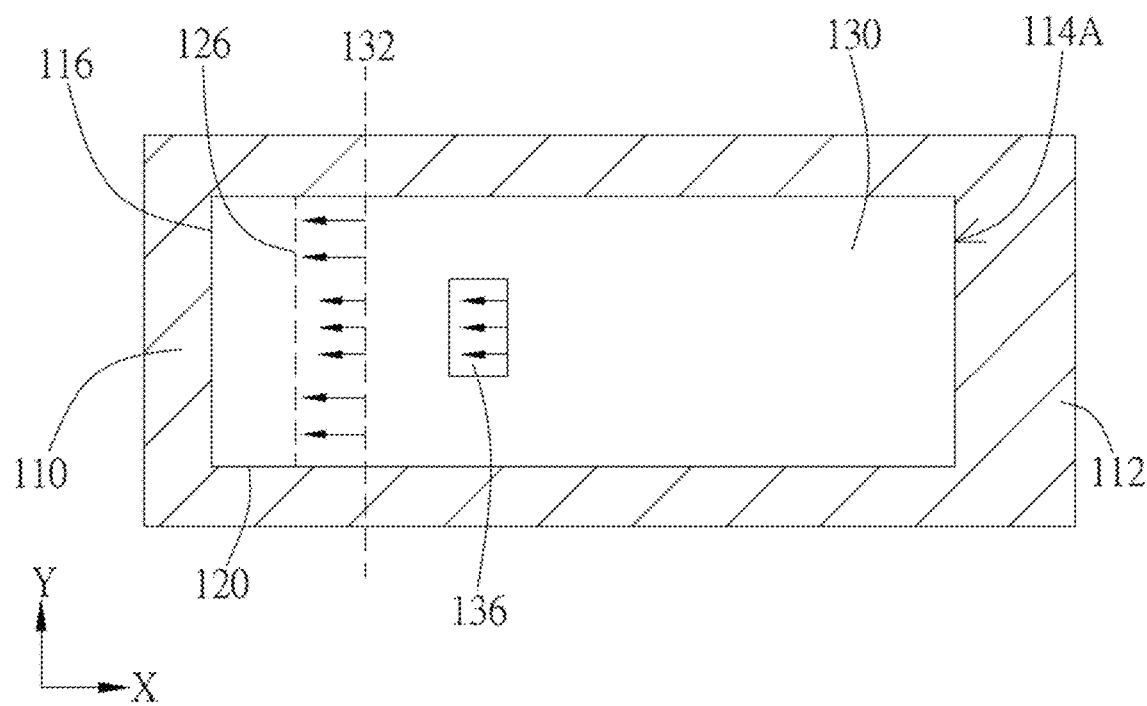

FIG. 3A and FIG. 3B are a schematic partially enlarged cross-sectional view and a schematic top view of the keyswitch (e.g. outer keyswitch 201) of the luminous keyboard in a third embodiment of the invention, showing the relative position of the outer light-transparent region 114A of the mask film 110, the patterned layer 120, and the light-exit edge 132 and the hole 136 of the light guide sheet 130. As shown in FIGS. 3A and 3B, in this embodiment, the light guide sheet 130 can have one or more holes 136, and a vertical projection of the hole 136 on the mask film 110 falls in the outer light-transparent region 114A. Moreover, in this embodiment, the vertical projection of the light-exit edge 132 of the light guide sheet 130 on the mask film 110 is farther away from the region boundary 116 than the layer boundary 126 is. With such a configuration, the hole 136 is configured to allow a portion of light emitted therefrom to improve local brightness of the outer light-transparent region 114A and attenuate the intensity of light emitted from the light exit edge 132. The patterned layer 120 in the outer light-transparent region 114A is configured to further modulate the brightness of the outer light-transparent reign 114A adjacent to the light exit edge 132, so as to improve the uniformity of brightness of the outer keyswitch 201. The hole 136 is preferably located corresponding the light-transparent portion of the keycap (e.g. the alphanumeric portion) at a farther side with respect to the light-exit edge 132, and the shape, size, and number of the hole 136 can be modified according to practical applications, not limited to the embodiment.

Figure 3C:
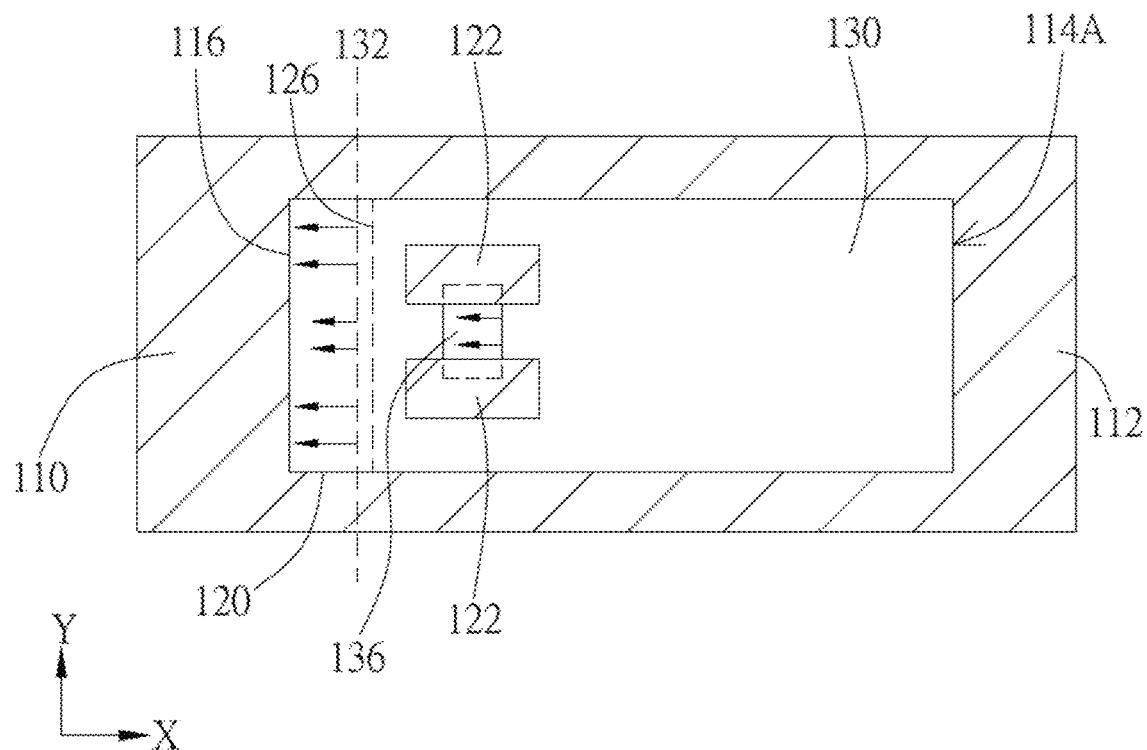
FIG. 3C is a variant embodiment of FIG. 3B, showing the relative position of the outer light-transparent region of the mask film, the patterned layer, the auxiliary mask pattern, and the light-exit edge and the hole of the light guide sheet.

FIG. 3C is a variant embodiment of FIG. 3B, showing the relative position of the outer light-transparent region 114A of the mask film 110, the patterned layer 120, the auxiliary mask pattern 122, and the light-exit edge 132 and the hole 136 of the light guide sheet 130. In this embodiment, the mask layer 120 further includes an auxiliary mask pattern 122. The auxiliary mask pattern 122 is disposed within the outer light-transparent region 114A, and the vertical projection of the hole 136 of the light guide sheet 130 on the mask film 110 at least partially overlaps with the auxiliary mask pattern 122. Specifically, the auxiliary mask pattern 122 can be a patterned coating on the mask film 110. The auxiliary mask pattern 122 can modulate the light intensity at the location corresponding to the hole 136 of the light guide sheet 130, so that the intensity of light emitting from the hole 136 can be controlled. For example, the auxiliary mask pattern 122 can be a strip or any pattern of suitable shape, which is located at the side of the hole 136 perpendicular to the light-exit edge 132. For example, two strips (e.g. the auxiliary mask pattern 122) are arranged along the Y-axis direction at two opposite sides of the hole 136. Moreover, the auxiliary mask pattern 122 can be a coating layer, which is configured to attenuate the light emitting from the hole 136, or a reflective coating, which is configured to reflect the light emitting from the through hole 136 toward the reflective film 150, so as to enhance the scattering of light and the lighting uniformity. The auxiliary mask pattern 122 preferably has a light transmittance larger than or equal to the light transmittance of the mask pattern 112. For example, the auxiliary mask pattern 122 can be formed by the same light-blocking material which forms the mask pattern 112 and printed together with the mask pattern 112 on the light-transparent film of the mask film 110, but not limited thereto. In another embodiment, the auxiliary mask pattern 122 can be formed by the same light-blocking material which forms the patterned layer 120 and printed together with the patterned layer 120 on the light-transparent film of the mask film 110. According to practical applications, the auxiliary mask pattern 122 can be formed by any suitable light-blocking material other than those for forming the mask pattern 112 and the patterned layer 120.

Figure 4A:
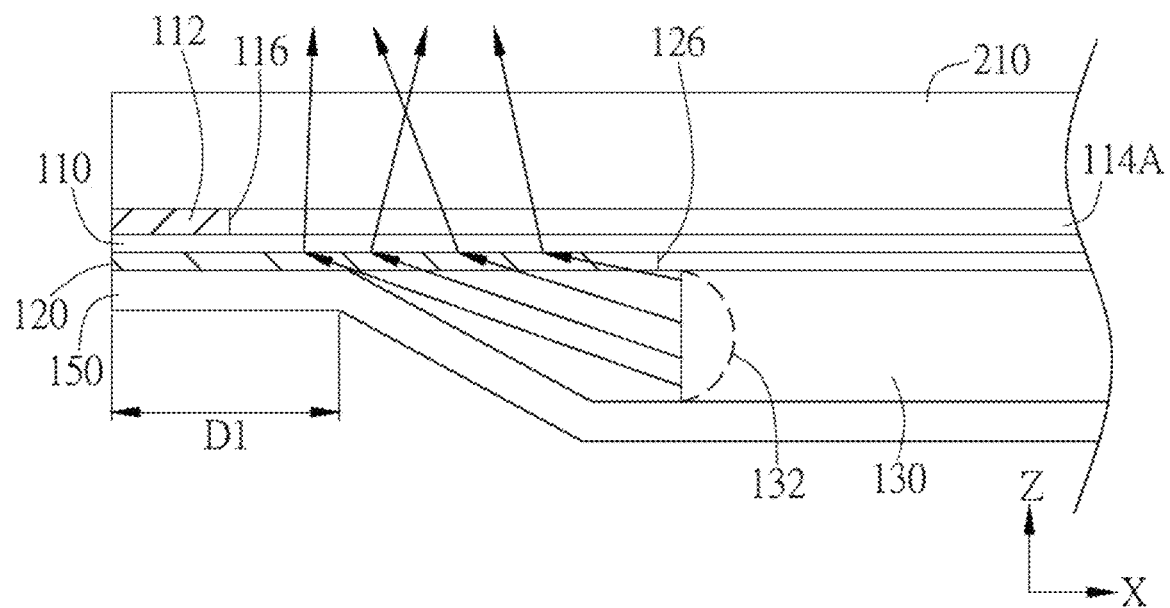
FIG. 4A and FIG. 4B are a schematic partially enlarged cross-sectional view and a schematic top view of the keyswitch of the luminous keyboard in a fourth embodiment of the invention, showing the relative position of the outer light-transparent region of the mask film, the patterned layer, and the light-exit edge of the light guide sheet.
Figure 4B:
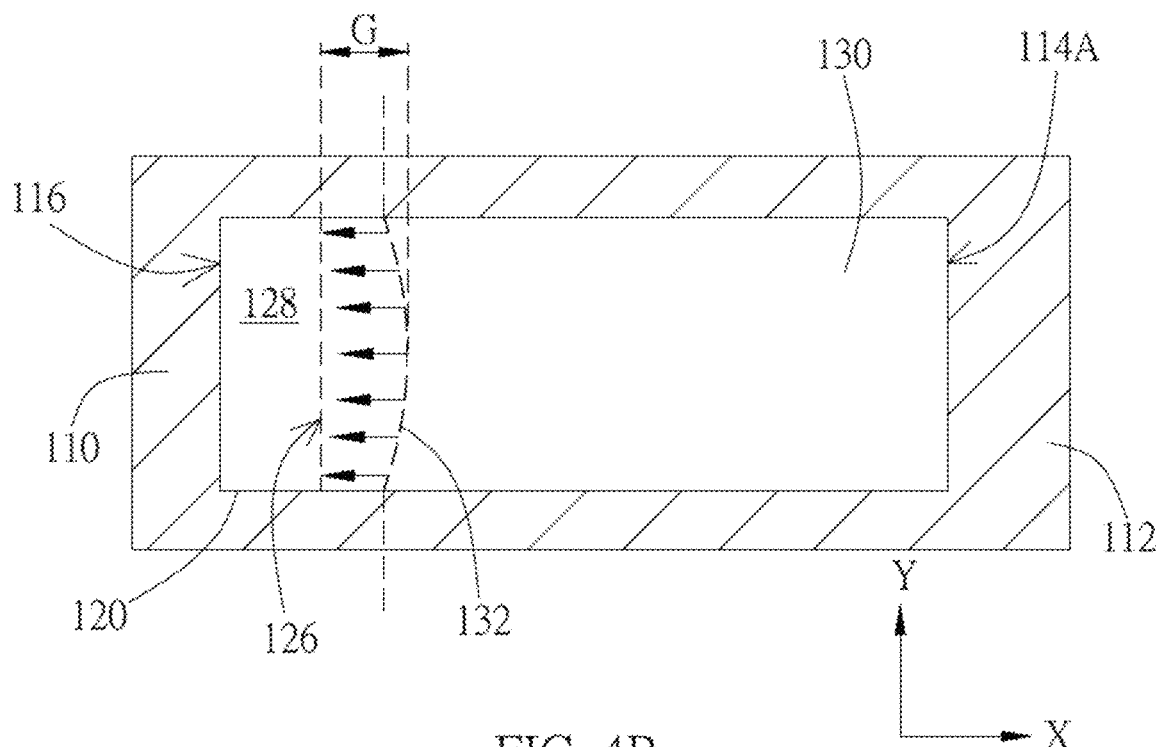

FIG. 4A and FIG. 4B are a schematic partially enlarged cross-sectional view and a schematic top view of the keyswitch of the luminous keyboard in a fourth embodiment of the invention, which are a variant embodiment corresponding to FIGS. 2B and 2C. Hereinafter, the differences between this embodiment and the previous embodiments will be explained, and other details can refer to the related descriptions of the previous embodiments and will not elaborate again. As shown in FIGS. 4A and 4B, in this embodiment, the patterned layer 120 (or the vertical projection thereof on the mask film) extends beyond the region 116 boundary into the outer light-transparent region 114A to form the strip region 128. The strip region 128 extends along the region boundary 116, and the layer boundary 126 is located between the region boundary 116 and the light-exit edge 132 in the X-axis direction. The vertical projection of the light-exit edge 132 of the light guide sheet 130 on the mask film 110 falls outside the strip region 128, i.e., not overlaps with the strip region 128. The vertical projection of the light-exit edge 132 on the mask film 110 at least partially falls within the outer light-transparent region 114A and is not parallel to the region boundary 116. In other words, the light guide sheet 130 is not only smaller than the mask film 110 (and the patterned layer 120) in the X-axis direction, but the size of the the light guide sheet 130 is so small that the edge of the light guide sheet 130 (i.e., light-exit edge 132) is retreated to the inner side of the region boundary 116 (and the layer boundary 126). As such, when the light guide sheet 130 and the mask film 110 with the patterned layer 120 are stacked together, in the X-axis direction, a gap G exists between the light-exit edge 132 and the layer boundary 126, and the gap G varies along the Y-axis direction. In other words, the light-exit edge 132 extends non-linearly along the Y-axis direction (or does not extend parallel to the region boundary 116 and/or the layer region 126), so that the gap G is not a constant value in the Y-axis direction.

In an embodiment, in the extending direction (e.g. the Y-axis direction) of the region boundary 116, the vertical projection of the light-exit edge 132 is concave with respect to the region boundary 116. In other words, the gap G at the position closer to two ends of the region boundary 116 along the Y-axis direction is smaller, and the gap G at the position closer to the center of the region boundary 116 in the Y-axis direction is larger. In such a configuration, part of the light can emit out earlier from the light-exit edge 132 of the light guide sheet 130, so that the light which is emitted from the lateral surface adjacent to the light-exit edge 132 is prevented from being too concentrated, thereby improving the lighting uniformity. The shape of the light-exit edge 132 can be modified according to the light energy required in practical applications, for example (but not limited to), a curve shape, a stepped shape, a zigzag shape, or any suitable shape.

Figure 5:
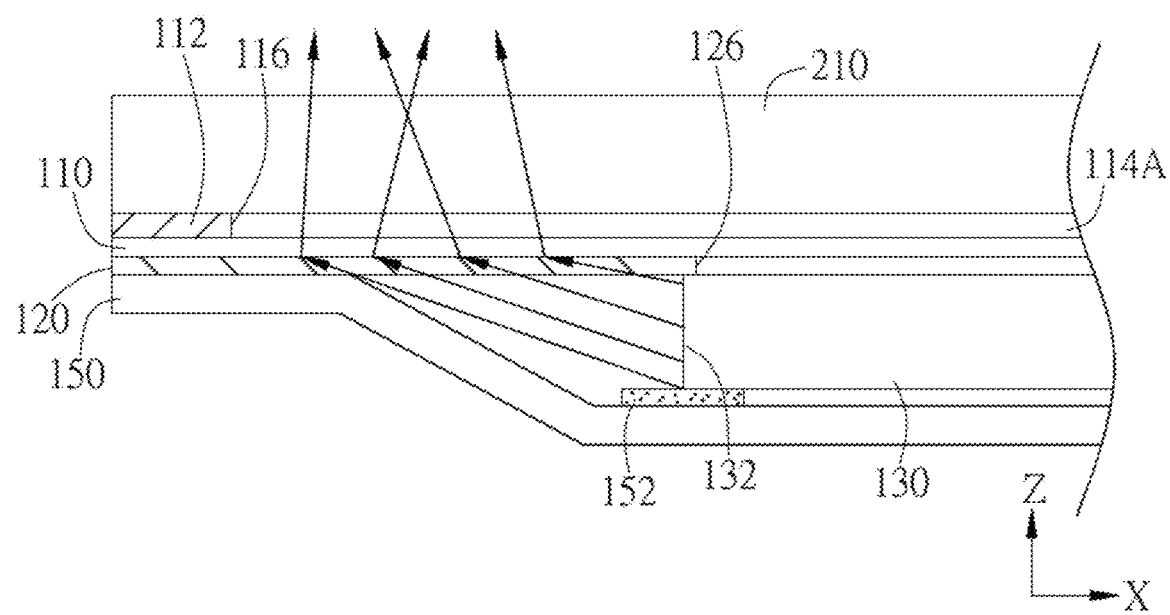
FIG. 5 is a partially enlarged cross-sectional view of the keyswitch of the luminous keyboard in a fifth embodiment of the invention.

FIG. 5 is a partially enlarged cross-sectional view of the keyswitch of the illuminous keyboard in a fifth embodiment of the invention, and FIG. 5 is a schematic view similar to FIG. 2B. Hereinafter, the differences between this embodiment and the above embodiments will be explained, and other details can refer to the related descriptions of the previous embodiments and will not elaborate again. As shown in FIG. 5, in this embodiment, a mask portion 152 is disposed between the reflective film 150 and the light guide sheet 130, and the mask portion 152 is adjacent to the light-exit edge 132. The vertical projection of the mask portion 152 on the mask film 110 preferably at least partially overlaps the patterned layer 120. Specifically, in an embodiment, the mask portion 152 can be an adhesive layer disposed between the reflective film 150 and the light guide sheet 130 along the light-exit edge 132 and configured to absorb the light energy to attenuate the light intensity to enhance the lighting uniformity. In another embodiment, the mask portion 152 can be a mask coating (or mask pattern), which is coated on the reflective film 150 along the light-exit edge 132 and configured to locally reduce the reflective effect of the reflective film 150, so as to attenuate the light intensity to enhance the lighting uniformity.

Figure 6:
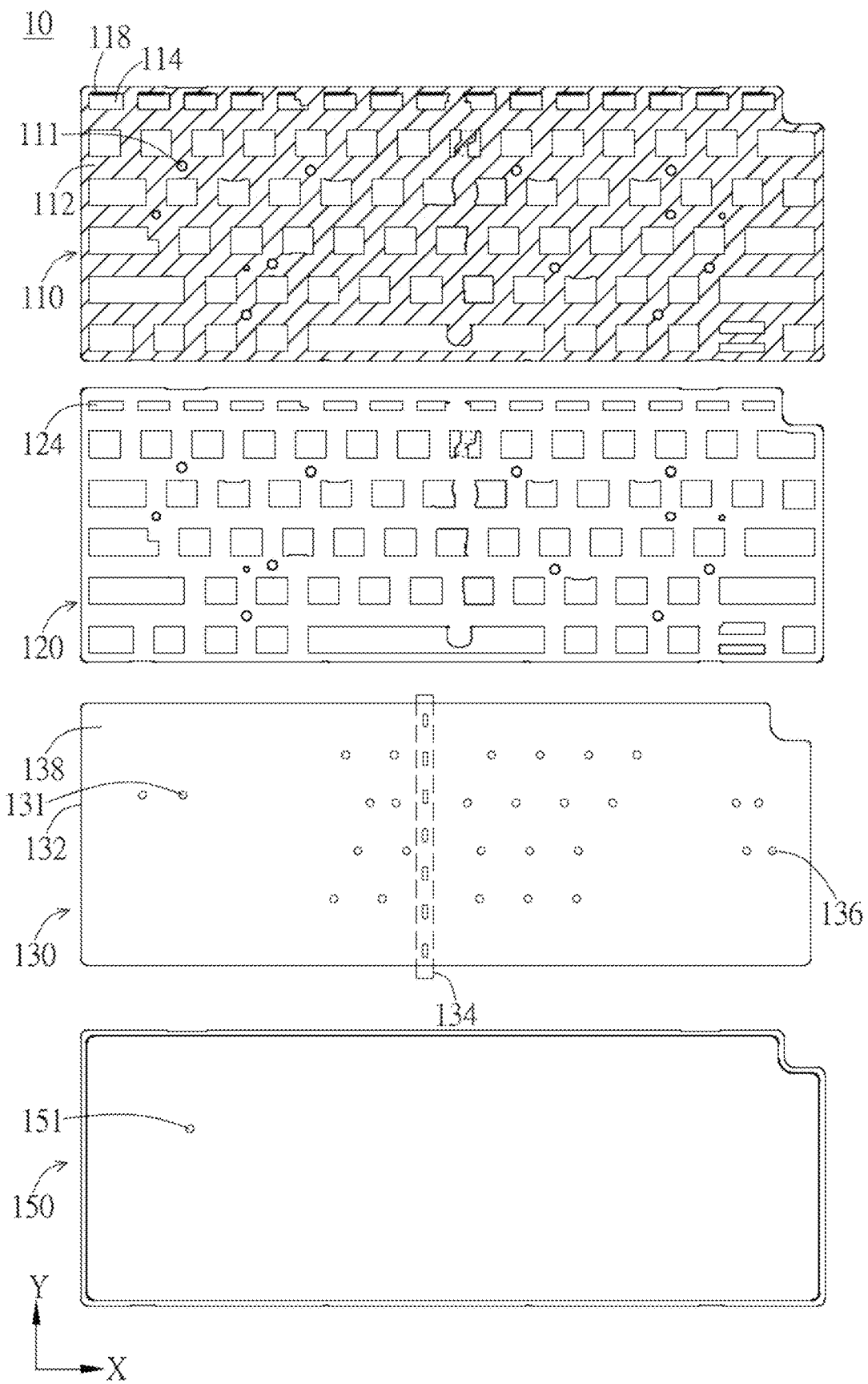
FIG. 6 is an exploded plan view, showing components of the optical module in an embodiment of the invention.

FIG. 6 is an exploded plan view, showing components of the optical module 10 in an embodiment of the invention, which is a schematic view similar to FIG. 1. Hereinafter, the differences between this embodiment and the previous embodiments will be explained, and other details can refer to the related descriptions of the previous embodiments and will not elaborate again. As shown in FIG. 6, in this embodiment, the size of the light guide sheet 130 corresponds to the size of the keyswitch module 20 and is slightly smaller than that of the mask film 110 (and the patterned layer 120). For example, the size of the light guide sheet 130 in the X-axis direction and/or the Y-axis direction is preferably smaller than the size of the mask film 110, so that the edge of the mask film 110 (and the patterned layer 120) extend beyond the light guide sheet 130, facilitating the adhesion with other components, such as the reflective film 150, the baseplate 210, but not limited thereto.

In an embodiment, the mask pattern 112 of the mask film 110 defines one or more light-transparent regions 114, a light-shielding region 113, and one or more light modulation regions 118. In this embodiment, the patterned layer 120 is preferably disposed on the mask film 110. The patterned layer has a light transmittance larger than a light transmittance of the light-shielding region 113 and smaller than a light transmittance of the light-transparent region 114. At least a portion of the patterned layer 120 is located the light modulation region 118, so the light modulation region 118 has an average light transmittance per unit area smaller than that of the light-transparent region 114 and larger than that of the light-shielding region 113.

For example, the mask pattern 112 is a pattern formed on the light-transparent optical film by disposing the light-blocking material thereon. The light-transparent region 114 is a region of the light-transparent optical film without the light-blocking material disposed thereon, and the light-shielding region 113 is a region of the light-transparent optical film with the light-blocking material disposed thereon. The light modulation region 118 extends from the light-shielding region 113 to the light-transparent region 114 to at least partially modulate the light energy between the light-shielding region 113 and the light-transparent region 114. In this embodiment, the mask pattern 112 defines a plurality of light-transparent regions 114, and the plurality of light-transparent regions 114 correspond to the plurality of keyswitches 200, respectively. For example, the number, location, and shape of the light-transparent regions 114 preferably correspond to those of the keyswitches 200, but not limited thereto. The light modulation region 118 can be selectively disposed at location corresponding to one or more keyswitches that require light modulation. For example, when the outer keyswitches 201 at the topmost row require light modulation, the light modulation regions 118 can be disposed along the X-axis direction to respectively correspond to the light-transparent regions 114, and the patterned layer 120 can be disposed on the mask film 110 to extend along the Y-axis direction into the light modulation region 118. The light-transparent region 114 allows light to pass therethrough. The light-shielding region 113 substantially blocks light. The light modulation region 118 partially allows light to pass therethrough and partially blocks light. Hereinafter, referring to FIGS. 7A to 11B, various embodiments of the configuration of the mask pattern of the mask film for a single keyswitch will be illustrated.

Figure 7A:
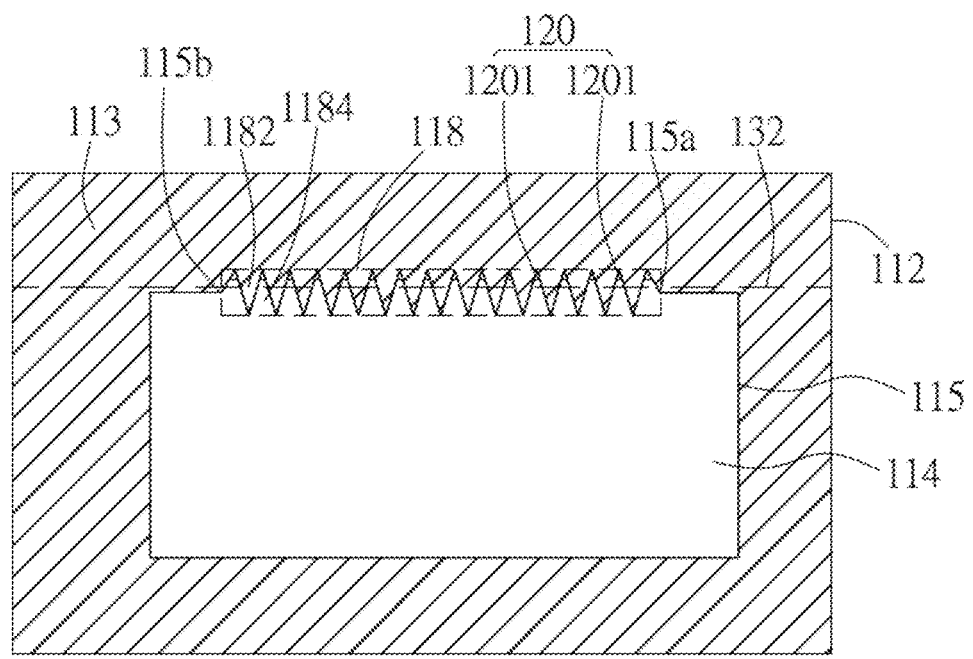
FIG. 7A is a schematic view of the optical module in a sixth embodiment of the invention, showing the relative position of the mask pattern of the mask film, the patterned layer, and the light guide sheet.

FIG. 7A is a schematic view of the optical module in a sixth embodiment of the invention. As shown in FIG. 7A, in an embodiment, the light-shielding region 113 partially surrounds the light-transparent region 114 to form a boundary line 115 between the light-shielding region 113 and the light-transparent region 114, and two ends 115a, 115b of the boundary line 115 are substantially connected to middle sections of two opposite sides of the light modulation region 118. For example, the light-shielding region 113 can be considered as surrounding and adjoining the light-transparent region 114 to substantially form a rectangular boundary line 115, and the light modulation region 118 extends between the light-shielding region 113 and the light-transparent region 114 across a portion of the boundary line 115, so that the middle sections of both sides of the light modulation region 118 are respectively connected to the two ends 115a and 115b of the boundary line 115. In an embodiment, the light modulation region 118 includes a plurality of light-shieling sub-regions 1182 and a plurality of light-transparent sub-regions 1184. The patterned layer 120 is disposed in the light modulation region 118 and extends into the light-shielding region 113. In an embodiment, the light-shieling sub-regions 1182 and the light-transparent sub-regions 1184 can be formed by the same light-blocking material of the light-shielding region 113, and at least a portion of the patterned layer 120 is disposed in the light-transparent sub-regions 1184 to form a plurality of patterned sub-regions 1201. In other words, the plurality of light-shieling sub-regions 1182 can be considered as a plurality of protrusions of the mask pattern 112, which is spaced apart and disposed along the boundary line 115 (or the region boundary 116), and the protrusions extend beyond the light-exit edge 132 across the boundary line 115 into the vertical projection of the light guide sheet 130 on the mask film 110. The patterned layer 120 (or the vertical projection thereof on the mask film 110) at least partially fills the space between adjacent two protrusions. Moreover, the plurality of patterned sub-region 1201 is disposed at one end of the plurality of light-transparent sub-regions 1184, such as the end adjacent to the light-shielding region 113 and away from the light-transparent region 114. The plurality of light-shielding sub-regions 1182 and the plurality of light-transparent sub-regions 1184 are alternatingly disposed, for example, along the edge 132 of the light guide sheet 130 or along the extending direction of the boundary line 115. Specifically, the plurality of light-shielding sub-regions 1182 are the regions where the light-shielding material is disposed in the light modulation region 118, and the plurality of light-transparent sub-regions 1184 are the regions where the light-shielding material is not disposed in the light modulation region 118. In other words, in the mask film 110, the light-shielding material is disposed at the light-shielding region 113 (e.g. gaps between adjacent keyswitches or border of the keyboard) and the plurality of light-shielding sub-regions 1182 to constitute the mask pattern 112. In an embodiment, each of the plurality of light-shielding sub-regions 1182 has a first end and a second end opposite to the first end. The first end is connected to the light-shielding region 113 adjacent to the patterned sub-regions 1201, and the second end extends to the light-transparent region 114. In this embodiment, the patterned sub-regions 1201 is disposed between adjacent light-shielding sub-regions 1182 near the first end. In an embodiment, the plurality of light-shielding sub-regions 1182 may have a same shape and a same size, and each light-shielding sub-region 1182 extends from the light-shielding region 113 through the patterned layer 120 to the light-transparent region 114, but not limited thereto. According to practical applications, the shape, size, and number of the light-shielding sub-regions 1182 may be different.

In this embodiment, the light-shielding sub-region 1182 has a triangle shape, so that the width of the first end of the light-shielding sub-region 1182 (i.e., the end adjacent to the light-shielding region 113) is larger than that of the second end (i.e., the end adjacent to the light-transparent region 114), and the width of the light-shielding sub-region 1182 is gradually reduced from the light-shielding region 113 to the light-transparent region 114. In other words, the wider bottom side of the triangular light-shielding sub-region 1182 is connected to the light-shielding region 113, and the light-shielding sub-region 1182 extends across the virtual connecting line between the two ends 115a and 115b of the boundary line 115, so that the vertex point of the triangular light-shielding sub-region 1182 points into the light-transparent region 114. The triangular light-shielding sub-regions 1182 are arranged along the edge 132 of the light guide sheet 130, so that one triangular light-transparent sub-region 1184 is located between two adjacent light-shielding sub-regions 1182, or one triangular light-shielding sub-region 1182 is located between two adjacent light-transparent sub-regions 1184. Correspondingly, the light-transparent sub-region 1184 has a similar triangular shape, so that the wider bottom side of the triangular light-transparent sub-region 1184 is proximate to the light-transparent region 114, and the vertex of the triangular light-transparent sub-region 1184 is proximate to the light-shielding region 113. In such a configuration, each of the plurality of light-shielding sub-regions 1182 has a gradually reduced width, so a width of each of the plurality of light-transparent sub-regions 1184 and a width of the portion of the patterned layer 120 in each of the light-transparent sub-regions 1184 (i.e., the patterned sub-region 1201) are gradually increased from the light-shielding region 113 toward the light-transparent region 114. As such, the light modulation region 118 has an average light transmittance per unit area larger than that of the light-shielding region and smaller than that of the light-transparent region. Specifically, in this embodiment, the average light transmittance per unit area of the light modulation region 118 is increased from the light-shielding region 113 to the light-transparent region 114. For example, "the average light transmittance per unit area of the light modulation region 118 is increased from the light-shielding region 113 to the light-transparent region 114" is referred to that the width of the light-transparent sub-region 1184 is increased from the light-shielding region 113 to the light-transparent region 114, or the area ratio of the light-transparent sub-region 1184 to the light-shielding sub-region 1182 (i.e. ratio of light-transmitting area of the light modulation region 118) is increased from the light-shielding region 113 to the light-transparent region 114. When the mask film 110 with the patterned layer 120, the light guide sheet 130, and the reflective film 150 are stacked on one another, the vertical projection of the edge 132 of the light guide sheet 130 on the mask film 110 at least partially falls within the light modulation region 118. As such, the light-shielding sub-regions 1182 of the light modulation region 118 shield the light emitted from the edge 132 of the light guide sheet 130, and the light-transparent sub-regions 1184 of the light modulation region 118 allow the light emitted from the edge 132 of the light guide sheet 130 to pass therethrough, so that the light emitted from the edge 132 of the light guide sheet 130 can be modulated by the mask film 110. The patterned layer 120 is disposed at appropriate position in the light modulation region 118 to further locally modulate the light transmittance of the light modulation region 118, so as to improve the lighting uniformity of the keyswitch and enhance the applicability of the slim border design to keyboards.

Figure 7B:
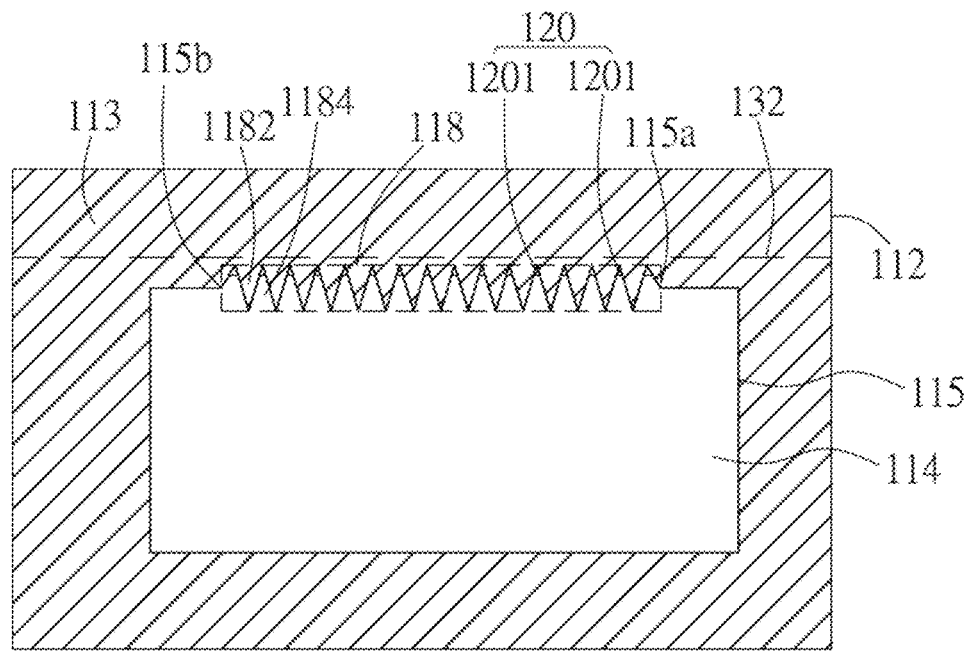
FIG. 7B is a variant embodiment of FIG. 7A, showing a schematic view of another relative position of the mask pattern of the mask film, the patterned layer, and the light guide sheet.

As shown in FIG. 7B, in a variant embodiment, the relative position of the mask pattern 112 of the mask film 110, the patterned layer 120, and the light guide sheet 130 is illustrated. In this embodiment, the mask pattern 112 of the mask film 110 defines the light-transparent region 114, the light-shielding region 113, and the light modulation region 118 similar to those of FIG. 7A. The difference between FIG. 7B and FIG. 7A is in that when the mask film 110 (with the patterned layer 120), the light guide sheet 130, and the reflective film 150 are stacked on one another, the vertical projection of the edge 132 of the light guide sheet 130 on the mask film 110 at least partially falls within the light-shielding region 113 adjacent to the light modulation region 118. As such, the light-shielding region 113 of the mask film 110 substantially fully shields the light emitted from the edge 132 of the light guide sheet 130, and the light-transparent sub-regions 1184 of the light modulation region 118 and the patterned sub-regions 1201 of the patterned layer 120 allow a portion of light emitted from the light guide sheet 130 to pass therethrough, so as to modulate the lighting uniformity. In other words, the distance (or relative position) between the edge 132 of the light guide sheet 130 and the light modulation region 118 can be modified according to practical lighting effects. When it requires to utilize more light emitted from the edge 132 of the light guide sheet 130, a design similar to FIG. 7A can be adopted, otherwise a design similar to FIG. 7B can be adopted.

Figure 8A:
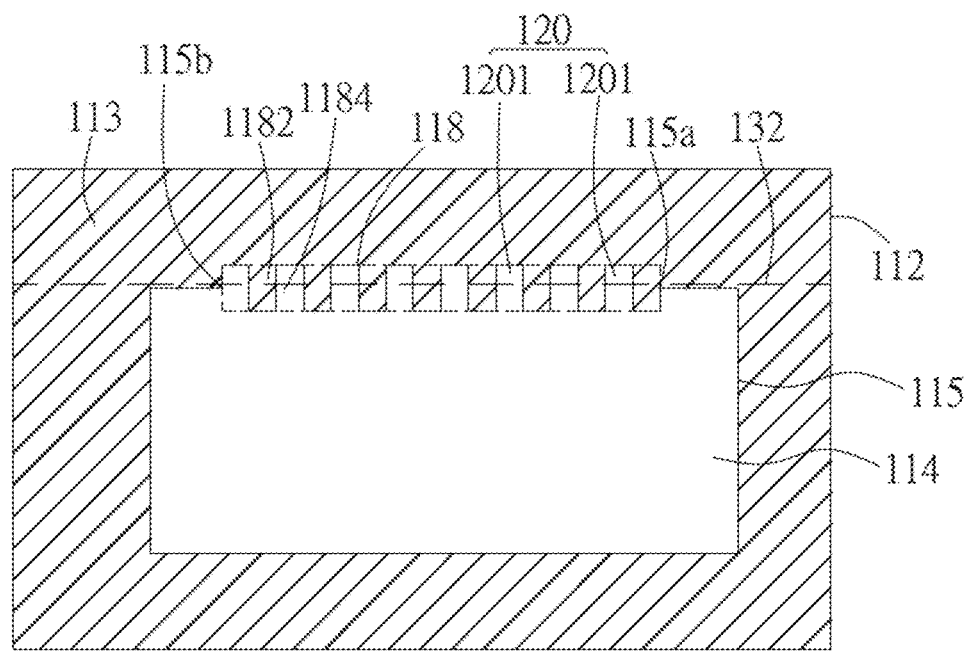
FIG. 8A is a schematic view of the optical module in a seventh embodiment of the invention, showing the relative position of the mask pattern of the mask film, the patterned layer, and the light guide sheet.
Figure 8B:
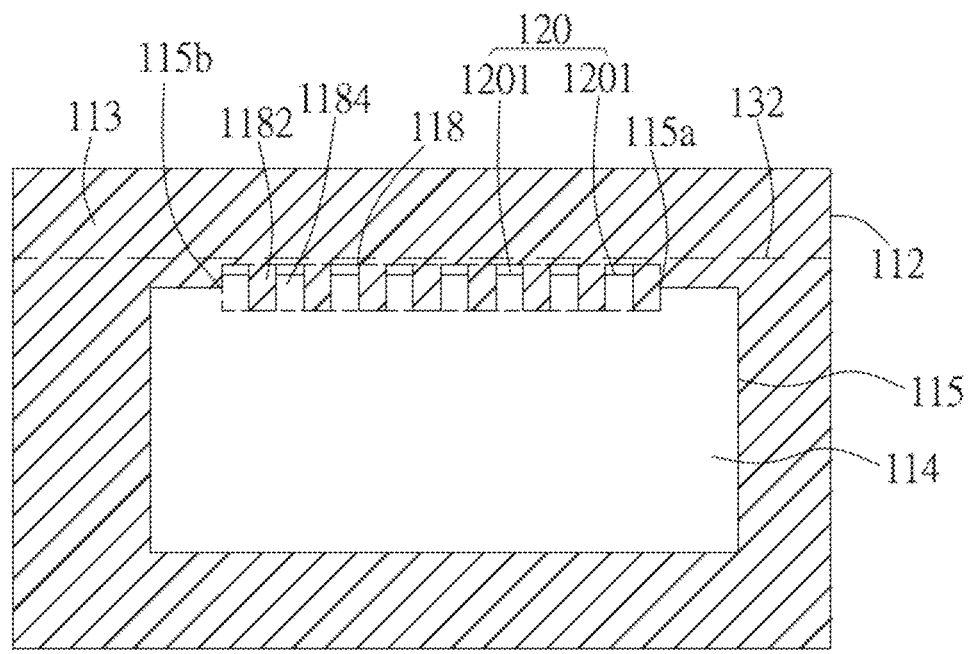
FIG. 8B is a variant embodiment of FIG. 8A, showing a schematic view of another relative position of the mask pattern of the mask film, the patterned layer, and the light guide sheet.

As shown in FIGS. 8A and 8B, the mask pattern 112 of the mask film 110 in a seventh embodiment is illustrated. The light modulation region 118 includes a plurality of light-transparent sub-regions 1184 and a plurality of light-shielding sub-regions 1182. The plurality of light-transparent sub-regions 1184 and the plurality of light-shielding sub-regions 1182 are alternatingly disposed along the edge 132 of the light guide sheet 130 (or along the extending direction of the boundary line 115). Hereinafter, the differences between the embodiments and the previous embodiments will be explained, and other details can refer to the related descriptions of the previous embodiments and will not elaborate again. In this embodiment, the light-shielding region 1182 is in the form of rectangle, so that the width of the first end is equal to the width of the second end. The plurality of light-shielding sub-regions 1182 is disposed at intervals along the edge 132 of the light guide sheet 130, so that one light-transparent sub-region 1184 is located between two adjacent light-shielding sub-regions 1182. Correspondingly, the light-transparent sub-region 1184 is in the form of rectangle, and the average light transmittance per unit area of the light modulation region 118 substantially maintains constant from the light-shielding region 113 to the light-transparent region 114 when the patterned layer 120 is not disposed in the light-transparent sub-regions 1184. In other words, the width of the light-transparent sub-region 1184 substantially maintains constant from the light-shielding region 113 to the light-transparent region 114, or the area ratio of the light-transparent sub-region 1184 to the light-shielding sub-region 1182 (i.e. ratio of light-transmitting area of the light modulation region 118) substantially maintains constant from the light-shielding region 113 to the light-transparent region 114. When the patterned layer 120 is disposed, for example adjacent to the light-shielding region 113 (at the first end) in the light-transparent sub-regions 1184, the light transmittance of the light modulation region 118 is further modulated (e.g. reduced), so as to achieve a desired light modulation. In other words, each of the plurality of light-shielding sub-regions 1182 has a substantially constant width, so a width of each of the plurality of light-transparent sub-regions 1184 and a width of the portion of the patterned layer 120 in each of the light-transparent sub-regions 1184 (i.e. the patterned sub-region 1201) are substantially constant from the light-shielding region 113 to the light-transparent region 114. Moreover, in FIG. 8A, the vertical projection of the edge 132 of the light guide sheet 130 at least partially falls within the light modulation region 118, and in FIG. 8B, the vertical projection of the edge 132 of the light guide sheet 130 falls within the light-shielding region 113 and adjacent to the light modulation region 118. The distance (or relative position) between the edge 132 of the light guide sheet 130 and the light modulation region 118 as well as the position of the patterned layer 120 can be modified according to practical lighting effects to adopt a design similar to FIG. 8A or FIG. 8B.

In the above embodiments, the light modulation region 118 is illustrated with the light-transparent sub-regions and the light-shielding sub-regions in the form of triangle or rectangle, but not limited thereto. In another embodiment (not shown), the light-transparent sub-regions and the light-shielding sub-regions may have any suitable shape, such as trapezoid, but not limited thereto. In other embodiments, according to practical applications, the light modulation region may have a gradation design by printing technology, so that the light transmittance of the light modulated region 118 is increased along the extending direction from the light-shielding region 113 through the patterned layer 120 toward the light-transparent region 114.

Figure 9A:
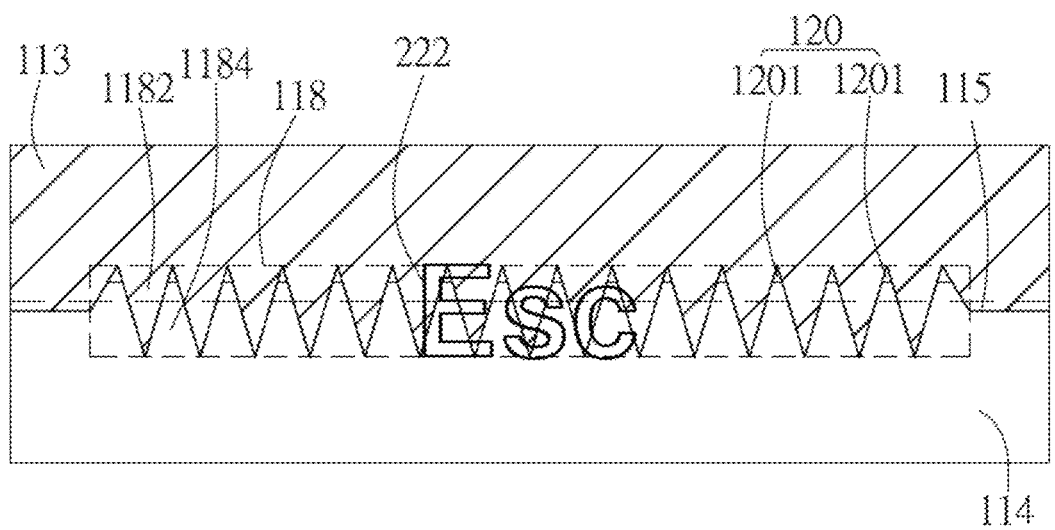
FIG. 9A is a schematic view of the optical module of the invention, showing the relative position of the light modulation region of the mask film, the patterned layer, and the light-transparent portion of the keycap.
Figure 9B:
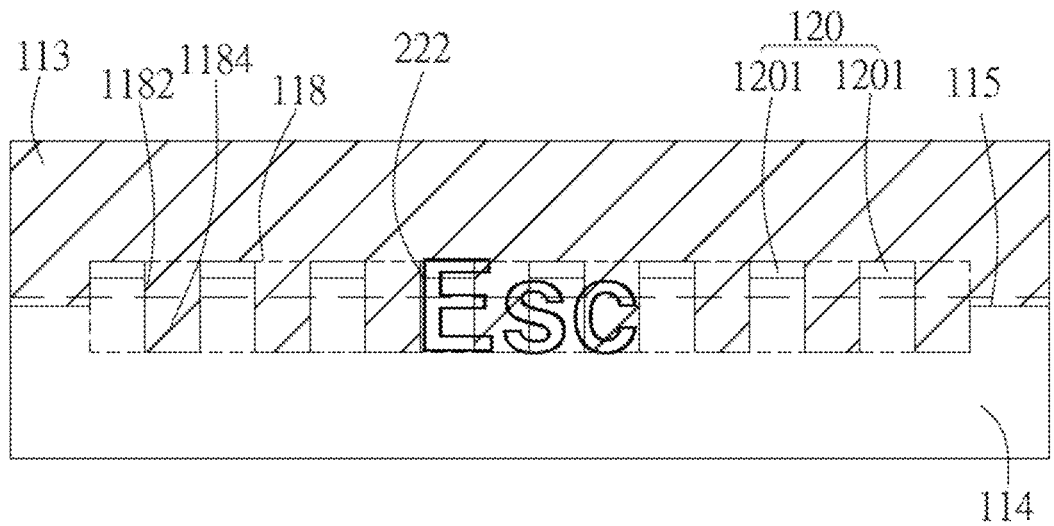
FIG. 9B is a variant embodiment of FIG. 9A.

As shown in FIGS. 9A and 9B, the relative positions of the light modulation region 118 of the mask films 110 of FIGS. 8A and 7A and the light-transparent portion 222 of the keycap 220 are illustrated, respectively. In these embodiments, the light-transparent portion 222 of the keycap 220 are illustrated with the symbol of "Esc" as an example. The plurality of light-shielding sub-regions 1182 and the plurality of light-transparent sub-regions 1184 of the light modulation region 118 are alternatingly arranged along an extending direction (or disposing position) of the light-transparent portion 222, and the plurality of patterned sub-regions 1201 is disposed at the top portion of the light-transparent sub-regions 1184. In other words, the plurality of light-shielding sub-regions 1182 and the plurality of light-transparent sub-regions 1184 are preferably alternatingly arranged along the longitudinal direction of the light-transparent portion 222. In an embodiment, the length of the light modulation region 118 extending from the light-shielding region 113 to the light-transparent region 114 and the width of the light modulation region 118 extending along the extending direction of the boundary line 115 are preferably at least equal to the height and the width of the light-transparent portion 222. In other words, the light modulation region 118 preferably covers the entire light-transparent portion 222 in the length and width directions. The boundary line 115 is preferably connected to the light modulation region 118 at ½ of the height of the light-transparent portion 222, but not limited thereto.

Figure 10A:
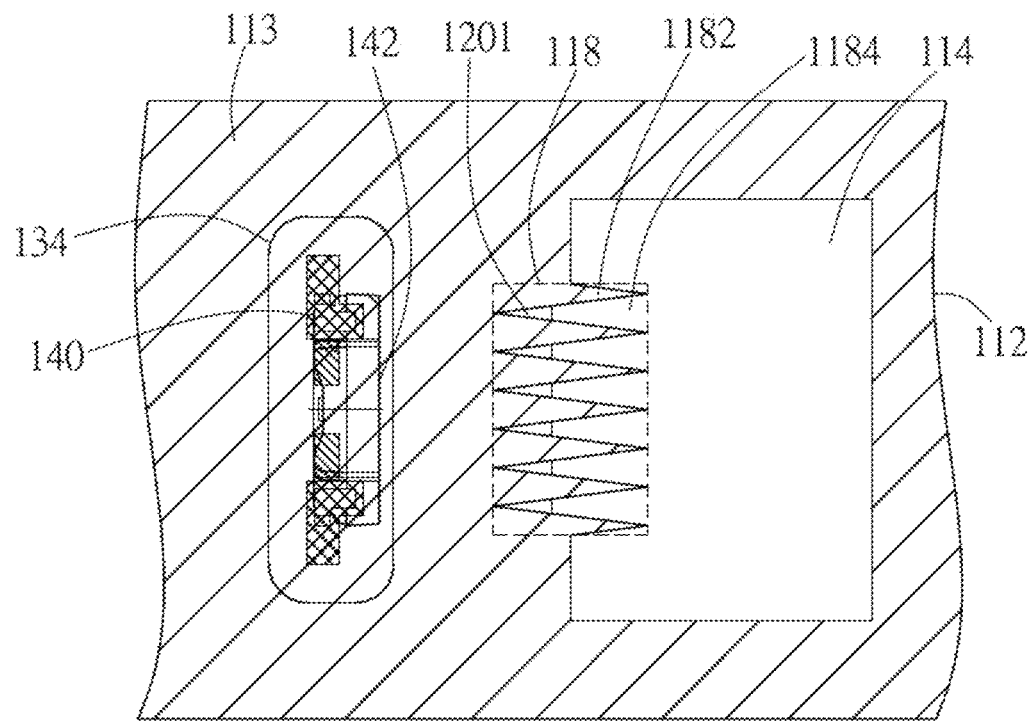
FIG. 10A is a schematic view of the optical module in an eighth embodiment of the invention, showing the relative position of the mask pattern of the mask film, the patterned layer, and the light source.
Figure 10B:
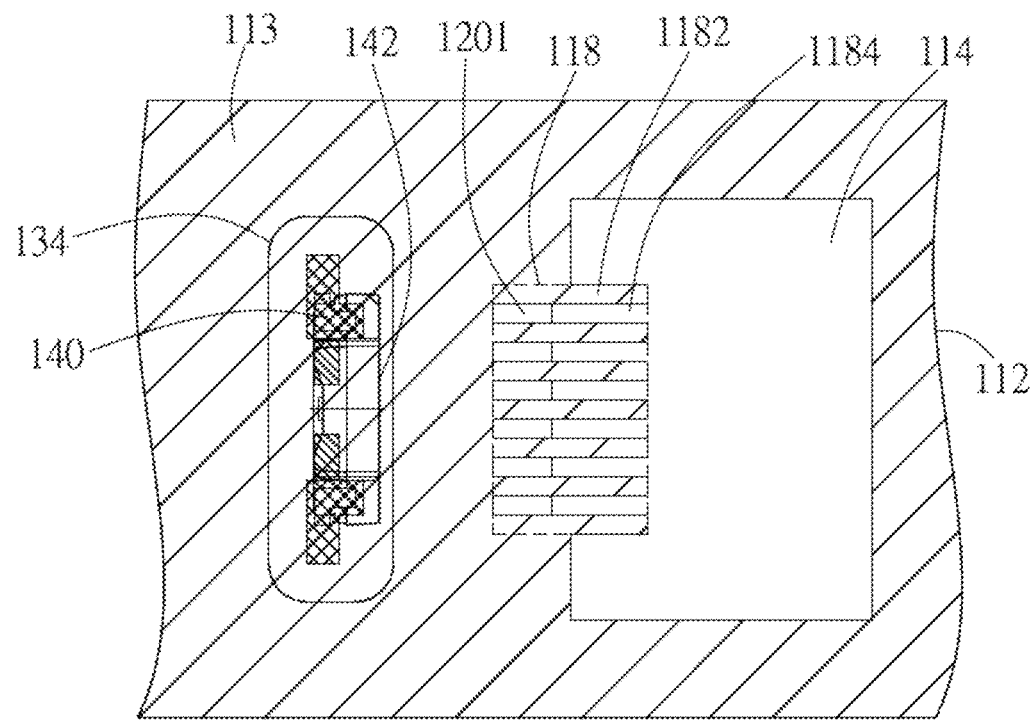
FIG. 10B is a variant embodiment of FIG. 10A.

FIG. 10A is a schematic view of an eighth embodiment of the invention, which shows the relative position of the mask pattern 112 of the mask film 110, the patterned layer 120, and the light source 140. FIG. 10B is a variant embodiment of FIG. 10A. As shown in FIGS. 10A and 10B, the light source 140 is disposed in the light source hole 134 of the light guide sheet 130, and the mask film 110 is disposed on the light guide sheet 130 and covers the light source hole 134 (and the light source 140). When the light source 140 is disposed adjacent to the keyswitch 200, the light modulation region 118 can be disposed at a location of the mask film 110 which corresponds to the keyswitch 200, so as to modulate the lighting uniformity of the keyswitch 200. For example, the mask pattern 112 (e.g. the light-shielding region 113) extends to cover the light source hole 134 (and the light source 140), and the light modulation region 118 can be disposed corresponding to the light-emitting surface 142 of the light source 140 and extend from the light-shielding region 113 to the light-transparent region 114, i.e., the light modulation region 118 is located between the light-transparent region 114 and the light-emitting surface 142 of the light source 140. The plurality of light-shielding sub-regions 1182 and the plurality of light-transparent sub-regions 1184 of the light modulation region 118 are alternatingly disposed along the light-emitting surface 142 of the light source 140, and the plurality of patterned sub-regions 1201 is disposed adjacent to the light source 140 in the light-transparent sub-regions 1184. In the embodiment of FIG. 10A, the light modulation region 118 has a configuration similar to FIG. 7A, wherein the width of the light-shielding sub-region 1182 is gradually reduced from the light-shielding region 113 to the light-transparent region 114, and the average light transmittance per unit area of the light modulation region 118 is increased from the light-shielding region 113 to the light-transparent region 114. In the embodiment of FIG. 10B, the light modulation region 118 has a configuration similar to FIG. 8A, wherein the width of the light-shielding sub-region 1182 substantially maintains the same from the light-shielding region 113 to the light-transparent region 114, and the average light-transmitting rate per unit area of the light modulation region 118 substantially maintains the same from the mask pattern 112 to the light-transparent region 114 when the patterned layer 120 is not disposed in the light-transparent sub-regions 1184. In practical applications, the number, shape, and size of the light-shielding sub-region 1182 (or the light-transparent sub-region 1184) of the light modulation region 118 as well as the patterned layer 120 can be modified according to the desired light intensity, the distance between the light-transparent region 114 and the light source 110, the location of light-transparent portion 222 of the keycap 220, and the like to achieve the desired optical effect.

Figure 11A:
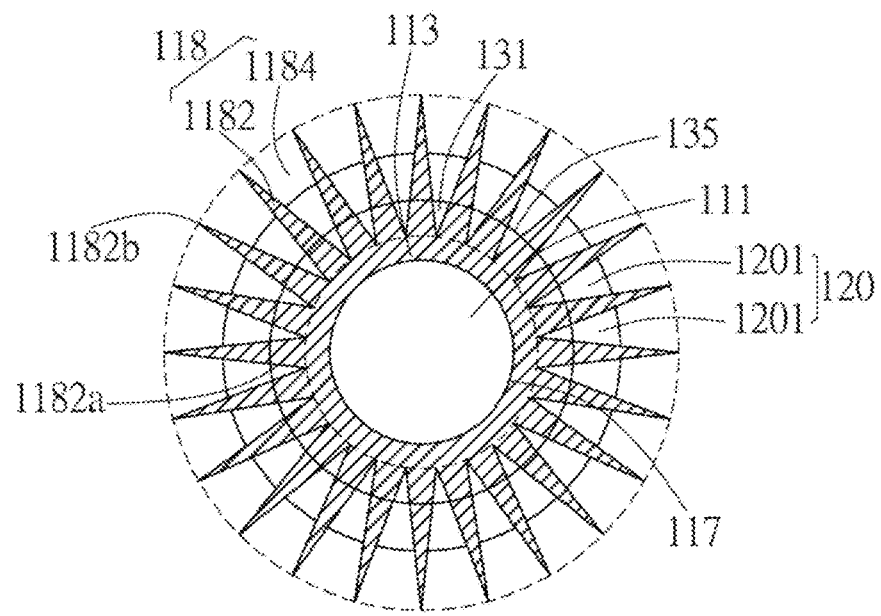
FIG. 11A is a schematic view of the optical module in a ninth embodiment of the invention, showing the relative position of the mask pattern of the mask film, the patterned layer, and the light guide sheet.

FIG. 11A is a schematic view of the optical module in a ninth embodiment of the invention, showing the relative position of the mask pattern of the mask film, the patterned layer, and the light guide sheet. For heat dissipation and positioning purposes, the optical module generally has one or more through holes to allow air flow or positioning means (e.g. bolts or screws) to pass therethrough. As shown in FIG. 6 and FIG. 11A, the mask film 110 has an upper hole 111. The light guide sheet 130 has a hole 131, and the reflective film 150 has a lower hole 151. When the mask film 110, the light guide sheet 130, and the reflective film 150 are stacked on one another, the upper hole 111, the hole 131, and the lower hole 151 are aligned and communicate with each other to form the through hole. When the through hole is located adjacent to the keyswitch, the light modulation region 118 can be disposed at a position corresponding to the keyswitch. As shown in FIG. 11A, the hole 131 of the light guide sheet 130 has an edge 135. The edge 117 of the upper hole 111 of the mask film 110 is located at the inner side of the edge 135 of the hole 131 of the light guide sheet 130. In other words, the diameter of the upper hole 111 is smaller than that of the hole 131, so that a portion of the mask film 110 around the upper hole 111 that protrudes into the hole 131 forms the light-shielding region 113 of a ring-like shape. The plurality of light-shielding sub-regions 1182 and the plurality of light-transparent sub-regions 1184 of the light modulation region 118 are alternatingly disposed along the edge 135 of the hole 131 of the light guide sheet 130, and extend from the light-shielding region 113 to the light-transparent region 114. Specifically, according to the actual location of the through hole corresponding to the keycap, the light modulation region 118 can fully surround the through hole to form a complete ring shaped region or partially surround the through hole to form a sector region. In this embodiment, the light modulation region 118 is illustrated to substantially completely surround the light-shielding region 113, i.e., the through hole is substantially located completely in the light-transparent region 114 corresponding to the keycap, so that the light-transparent region 114 can be the peripheral region surrounding the light modulation region 118, but not limited thereto. In another embodiment, the light modulation region 118 can be a sector region which partially surrounds the light-shielding region 113, i.e., the through hole is partially located in the light-transparent region 114 corresponding to the keycap, so that the light-transparent region 114 can be the sector peripheral region surrounding the outer edge of the light modulation region 118, and the light-shielding region 113 is connected to the lateral sides of the sector region and extends to the inner edge of the light modulation region 118.

In this embodiment, each light-shielding sub-region 1182 has a triangle-like shape. The first end 1182a of the light-shielding sub-region 1182 is connected to the light-shielding region 113, and the second end 1182b of the light-shielding sub-region 1182 extends to the light-transparent region 114. The width of the first end 1182a is larger than that of the second end 1182b, so that the width of the light-shielding sub-region 1182 is gradually reduced from the light-shielding region 113 to the light-transparent region 114. In this embodiment, the central line of the second end 1182b of the light-shielding sub-region 1182 (e.g. angle bisector) preferably runs through the centers of the hole 131 and the upper hole 111. The plurality of light-shielding sub-regions 1182 are preferably arranged along the edge 135 of the hole 131 of the light guide sheet 130, so that one light-transparent sub-region 1184 is located between two adjacent light-shielding sub-regions 1182. Correspondingly, the light-transparent sub-region 1184 has a triangle-like shape. Because the light modulation region 118 surrounds the light-shielding region 113 and extends radially outward toward the light-transparent region 114, the wider bottom side of the light-transparent sub-region 1184 is proximate to the light-transparent region 114 and has an arc length larger than the arc length of the first end 1182a of the light-shielding sub-region 1182, and the vertex of the light-transparent sub-region 1184 is proximate to the light-shielding region 113. In this embodiment, when the mask film 110 and the light guide sheet 130 are stacked on each other, the vertical projection of the edge 135 of the hole 131 of the light guide sheet 130 on the mask film 110 at least partially falls within the light modulation region 118, so that the lighting uniformity of the keyswitch which corresponds to the through hole can be enhanced by the light modulation region 118.

In this embodiment, at least a portion of the patterned layer 120 is located in the light-transparent sub-regions 1184. Each of the plurality of light-shielding sub-regions 1182 has a gradually reduced width, so a width of each of the plurality of light-transparent sub-regions 1184 and a width of the portion of the patterned layer 120 in each of the light-transparent sub-regions 1184 (i.e., the patterned sub-region 1201) are gradually increased from the light-shielding region 113 toward the light-transparent region 114. With the arrangement of the patterned layer 120, the light transmittance of the light modulation region 118 can be further modulated to improve the lighting uniformity of the keyswitch.

Figure 11B:
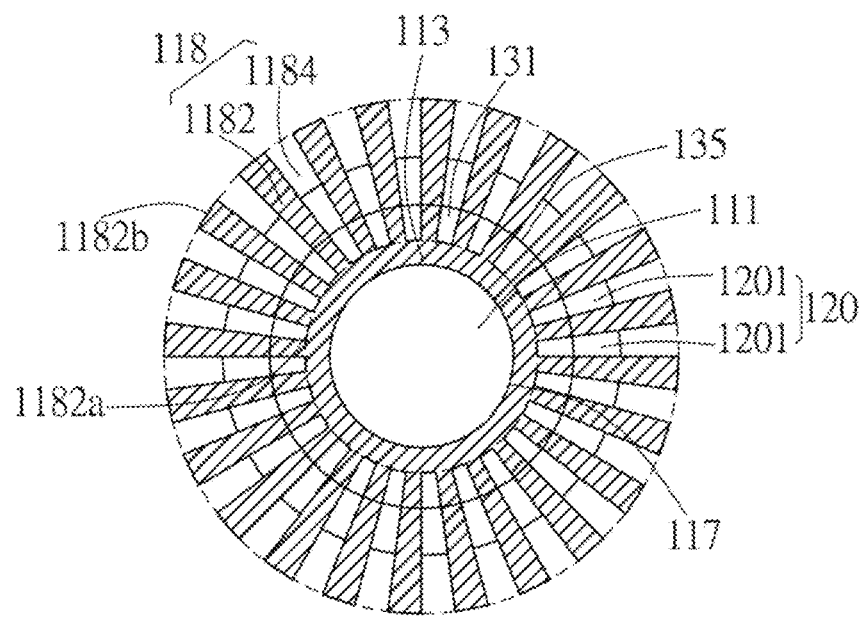
FIG. 11B is a variant embodiment of FIG. 11A.

FIG. 11B is a variant embodiment of FIG. 11A. In this embodiment, the light-shielding sub-region 1182 has a sector shape, wherein the extending directions of two lateral sides of the sector preferably run through the centers of the hole 131 and the upper hole 111. In this embodiment, because the light modulation region 118 surrounds the light-shielding region 113 and extends radially outward toward the light-transparent region 114, the width of the first end 1182a of the light-shielding sub-region 1182 is smaller than that of the second end 1182b, and the width of the light-shielding sub-region 1182 is gradually increased from the light-shielding region 113 to the light-transparent region 114. In other words, the plurality of light-shielding sub-regions 1182 are arranged at intervals along the edge 135 of the hole 131 of the light guide sheet 130, so that one light-transparent sub-region 1184 is located between two adjacent light-shielding sub-regions 1182. Correspondingly, the light-transparent sub-region 1184 is in the form of sector, and the width of light-transparent sub-region 1184 is gradually increased from the light-shielding region 113 to the light-transparent region 114. The area ratio of the light-transparent sub-region 1184 to the light-shielding sub-region 1182 of the light modulation region 118 substantially maintains the same from the light-shielding region 113 to the light-transparent region 114, but the light-transmitting area of the light modulation region 118 is gradually increased as the distance from the light-shielding region 113 increases. In this embodiment, when the mask film 110 and the light guide sheet 130 are stacked on each other, the vertical projection of the edge 135 of the hole 131 of the light guide sheet 130 on the mask film 110 at least partially falls within the light modulation region 118, so that the lighting uniformity of the keyswitch which corresponds to the through hole can be enhanced by the light modulation region 118.

In this embodiment, at least a portion of the patterned layer 120 is located in the light-transparent sub-regions 1184. Each of the plurality of light-shielding sub-regions 1182 has a gradually increased width, so a width of each of the plurality of light-transparent sub-regions 1184 and a width of the portion of the patterned layer 120 in each of the light-transparent sub-regions 1184 (i.e., the patterned sub-region 1201) are gradually increased from the light-shielding region 113 toward the light-transparent region 114.

Moreover, in the above embodiments, the light-shielding sub-regions 1182 are illustrated to be formed by the same light-blocking material of the light-shielding region 113, but not limited thereto. In other embodiments, the light-shielding sub-regions 1182 can be formed by the same light-blocking material of the patterned layer 120. For example, in an embodiment, the patterned layer 120 constitutes the light-shielding sub-regions 1182 of the light modulation region 118, and the portion of the light modulation region 118 without disposing the patterned layer 120 can be considered as the light-transparent sub-regions 1184. In another embodiment, the patterned layer 120 can not only constitute the light-shielding sub-regions 1182 of the light modulation region 118, but also partially or fully fill the light-transparent sub-regions 1184.

It is noted that in other embodiments, one or more of the structure designs for enhancing the brightness or light distribution of the outer keyswitch of the above various embodiments (e.g. the design of non-linear light-exit edge and/or through hole of the light guide sheet, the design of auxiliary mask pattern and/or light-transparent sub-region of the mask film, the design of mask portion of the reflective film) can be optionally integrated into one or more keyswitches of a single luminous keyboard, so as to improve the lighting uniformity of the luminous keyboard.

It is noted that one or more arrangements of the light modulation region of the above various embodiments can be optionally integrated into a single luminous keyboard, so as to improve the lighting uniformity of the luminous keyboard by modulating the light distribution of the desired keyswitch (es), such as the outer keyswitch, the keyswitch adjacent to the through hole and/or the light source. Moreover, in the above embodiments, the patterned layer can be disposed at any suitable location to modulate the light transmittance, so as to achieve a desired light distribution.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. An optical module for a luminous keyboard comprising a plurality of keyswitches, the optical module comprising:
    a mask film having a mask pattern, the mask pattern defining a plurality of light-transparent regions respectively corresponding to the plurality of keyswitches, an outer light-transparent region of the plurality of light-transparent regions having a region boundary;
    a patterned layer disposed on the mask film, the patterned layer having a light transmittance larger than a light transmittance of the mask pattern; and
    a light guide sheet on one side of the mask film, the light guide sheet having a light-exit edge, on the mask film a vertical projection of the light-exit edge of the light guide sheet at least partially falling within the outer light-transparent region,
    wherein the patterned layer is at least partially located in the outer light-transparent region adjacent to the region boundary,
    wherein the light guide sheet has a hole, and on the mask film a vertical projection of the hole falls in the outer light-transparent region.

2. The optical module of claim 1, wherein the patterned layer extends from the region boundary into the outer light-transparent region to define a layer boundary, and on the mask film the vertical projection of the light-exit edge of the light guide sheet is located between the region boundary and the layer boundary.

3. The optical module of claim 1, wherein the patterned layer extends from the region boundary into the outer light-transparent region to define a layer boundary, and on the mask film the vertical projection of the light-exit edge of the light guide sheet is farther away from the region boundary than the layer boundary is.

4. The optical module of claim 1, wherein the mask film further has an auxiliary mask pattern in the outer light-transparent region; on the mask film the vertical projection of the hole at least partially overlaps the auxiliary mask pattern; the auxiliary mask pattern has a light transmittance larger than or equal to the light transmittance of the mask pattern.

5. The optical module of claim 1, further comprising a reflective film on one side of the light guide sheet opposite to the mask film, wherein a mask portion is disposed between the reflective film and the light guide sheet and adjacent to the light-exit edge, and on the mask film a vertical projection of the mask portion at least partially overlaps the patterned layer.

6. An optical module for a luminous keyboard comprising a plurality of keyswitches, the optical module comprising:
   a mask film having a mask pattern, the mask pattern defining a plurality of light-transparent regions respectively corresponding to the plurality of keyswitches, the plurality of light-transparent regions comprising an outer light-transparent region;
   a patterned layer disposed on the mask film, the patterned layer having a light transmittance larger than a light transmittance of the mask pattern; and
   a light guide sheet on one side of the mask film,
   wherein at least a portion of the patterned layer does not overlap the mask pattern and is adjacent to the outer light-transparent region, so as to define a region boundary of the outer light-transparent region together with the mask pattern,
   wherein the light guide sheet has a light-exit edge, and on the mask film a vertical projection of the light-exit edge is located outside the outer light-transparent region and overlaps the at least a portion of the patterned layer.

7. The optical module of claim 6, further comprising a reflective film on one side of the light guide sheet opposite to the mask film, wherein a mask portion is disposed between the reflective film and the light guide sheet and adjacent to the light-exit edge, and on the mask film a vertical projection of the mask portion at least partially overlaps the at least a portion of the patterned layer.

8. An optical module for a luminous keyboard, comprising:
   a mask film having a mask pattern, the mask pattern defining a light-transparent region, a light-shielding region, and a light modulation region extending from the light-shielding region to the light-transparent region; and
   a patterned layer disposed on the mask film, the patterned layer having a light transmittance larger than a light transmittance of the mask pattern,
   wherein the patterned layer is located in the light modulation region, so the light modulation region has a light transmittance larger than a light transmittance of the light-shielding region and smaller than a light transmittance of the light-transparent region.

9. The optical module of claim 8, further comprising a light guide sheet having an edge, wherein when the mask film is stacked on the light guide sheet, on the mask film a vertical projection of the edge of the light guide sheet at least partially falls in the light modulation region or in the light-shielding region adjacent to the light modulation region.

10. The optical module of claim 8, wherein the light-shielding region partially surrounds the light-transparent region to form a boundary line, and two ends of the boundary line are substantially connected to middle sections of two opposite sides of the light modulation region.

11. The optical module of claim 8, wherein the light modulation region comprises a plurality of light-transparent sub-regions and a plurality of light-shielding sub-regions alternatingly disposed, and at least a portion of the patterned layer is located in the light-transparent sub-regions.

12. The optical module of claim 11, wherein each of the plurality of light-shielding sub-regions has a gradually reduced width, so a width of each of the plurality of light-transparent sub-regions and a width of the portion of the patterned layer in each of the light-transparent sub-regions are gradually increased from the light-shielding region toward the light-transparent region.

13. The optical module of claim 11, wherein each of the plurality of light-shielding sub-regions has a substantially constant width, so a width of each of the plurality of light-transparent sub-regions and a width of the portion of the patterned layer in each of the light-transparent sub-regions are substantially constant from the light-shielding region to the light-transparent region.

14. The optical module of claim 11, further comprising a light source having a light-emitting surface, wherein on the mask film a vertical projection of the light source falls within the light-shielding region; the plurality of light-shielding sub-regions extends from the light-shielding region and is located between the light-transparent region and the light-emitting surface.

15. The optical module of claim 8, further comprising a light guide sheet having a hole, wherein when the mask film is stacked on the light guide sheet, on the mask film a vertical projection of an edge of the hole of the light guide sheet at least partially falls within the light modulation region.

16. The optical module of claim 15, wherein the light modulation region comprises a plurality of light-transparent sub-regions and a plurality of light-shielding sub-regions alternatingly disposed along the edge of the hole of the light guide sheet; at least a portion of the patterned layer is located in the light-transparent sub-regions; each of the plurality of light-shielding sub-regions has a gradually reduced width, so a width of each of the plurality of light-transparent sub-regions and a width of the portion of the patterned layer in each of the light-transparent sub-regions are gradually increased from the light-shielding region toward the light-transparent region.

17. The optical module of claim 15, wherein the light modulation region comprises a plurality of light-transparent sub-regions and a plurality of light-shielding sub-regions alternatingly disposed along the edge of the hole of the light guide sheet; at least a portion of the patterned layer is located in the light-transparent sub-regions; each of the plurality of light-shielding sub-regions has a gradually increased width, so a width of each of the plurality of light-transparent sub-regions and a width of the portion of the patterned layer in each of the light-transparent sub-regions are gradually increased from the light-shielding region toward the light-transparent region.

* * * * *